(12) United States Patent
Koike et al.

(10) Patent No.: US 7,312,789 B2
(45) Date of Patent: Dec. 25, 2007

(54) INPUT DEVICE WITH EXTENDIBLE BODY

(75) Inventors: Tamotsu Koike, Shinagawa (JP); Shuji Nakamura, Shinagawa (JP); Toshihiko Sugio, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 523 days.

(21) Appl. No.: 10/305,957

(22) Filed: Nov. 29, 2002

(65) Prior Publication Data

US 2003/0103040 A1 Jun. 5, 2003

(30) Foreign Application Priority Data

Nov. 30, 2001 (JP) ............................. 2001-367083
Jun. 28, 2002 (JP) ............................. 2002-190869

(51) Int. Cl.
*G09G 5/08* (2006.01)

(52) U.S. Cl. ...................... 345/163; 345/156; 345/157; 345/164; 345/165; 345/166; 345/167; D14/402; D14/403

(58) Field of Classification Search ........ 345/163–167, 345/156, 157; D14/402, 403
See application file for complete search history.

(56) References Cited

U.S. PATENT DOCUMENTS

| | | | | |
|---|---|---|---|---|
| 5,790,098 A | * | 8/1998 | Lin ............................. | 345/163 |
| 6,157,370 A | * | 12/2000 | Kravtin et al. .............. | 345/163 |
| 6,266,047 B1 | * | 7/2001 | Benja-Athon ............... | 345/163 |
| 6,353,429 B1 | * | 3/2002 | Long ........................... | 345/158 |
| 6,489,947 B2 | * | 12/2002 | Hesley et al. ............... | 345/163 |
| 6,676,317 B2 | * | 1/2004 | Ozaki ........................ | 400/636.3 |

FOREIGN PATENT DOCUMENTS

| | | |
|---|---|---|
| JP | 10-307679 | 11/1998 |
| JP | 2001-34405 | 2/2001 |
| JP | 2001-125731 | 5/2001 |
| JP | 2001125731 A * | 5/2001 |

* cited by examiner

*Primary Examiner*—Richard Hjerpe
*Assistant Examiner*—Jennifer T Nguyen
(74) *Attorney, Agent, or Firm*—Staas & Halsey LLP

(57) ABSTRACT

An input device having an extendible body or housing suitable for a hand-held operation. The input device includes a housing assembly including a palm-rest section and a base section opposite to the palm-rest section, a switch mechanism accommodated in the housing assembly and including an operating section arranged adjacent to the palm-rest section, and a motion detecting mechanism accommodated in the housing assembly and including a detecting section arranged adjacent to the base section. The housing assembly includes a plurality of cover members configured by dividing the palm-rest section and the base section into plural parts while keeping a condition where the palm-rest section and the base section are integrally associated with each other. The housing assembly also includes an inner casing at least partially enclosed within the plurality of cover members, and a link arrangement for linking the plurality of cover members with the inner casing. The inner casing carries the switch mechanism and the motion detecting mechanism. The link arrangement permits the plurality of cover members to shift, relative to each other in a desired direction, toward or away from each other.

9 Claims, 28 Drawing Sheets

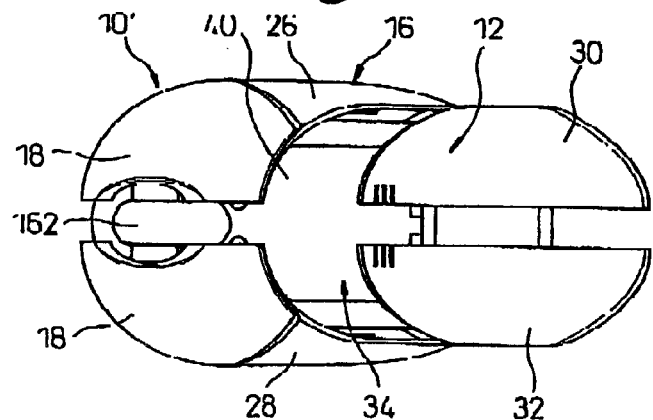
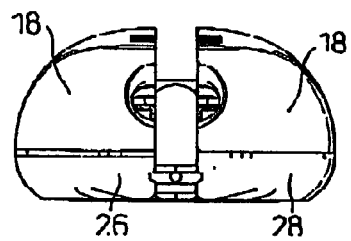
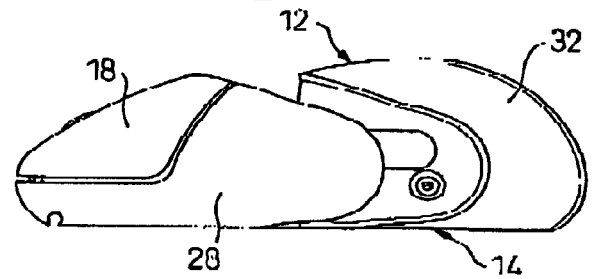
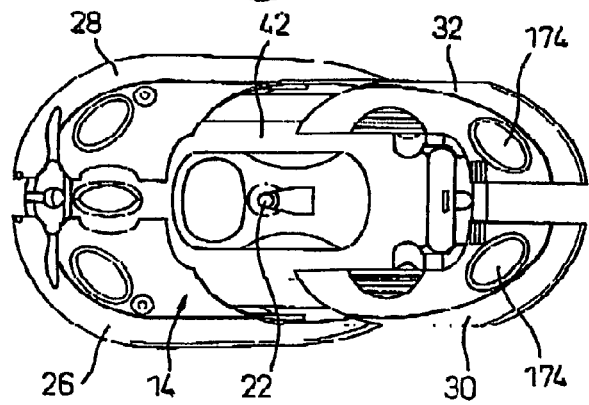

INPUT DEVICE WITH EXTENDIBLE BODY

BACKGROUND OF THE INVENTION

1. Field of the Invention

The present invention relates, generally, to an input device for electronic equipment and, more particularly, to an input device connectable with data processors for a hand-held operation.

2. Description of the Related Art

Conventional input devices, connectable for use with digital data processors, such as personal computers, work stations, etc., are known to be operable in various modes. For example, a small-sized input device, generally referred to as a mouse, for enabling an operator to manually enter analogue-mode information so as to direct coordinate data, such as cursor shifting data, on a display screen is known to be simply operable by one hand of the operator. In particular, it is desired for this type of input device to have improved operability, in an ergonomic sense, so as to be comfortably operable by any operator irrespective of attributes such as age or gender.

From this viewpoint, it has been provided, in the above-described small-sized input device, that a body or housing of the input device is formed with a graspable or palm-rest section, on which an operator puts his hand, capable of enlarging and reducing the dimensions of the palm-rest section as the occasion demands. Conventionally, the enlarging/reducing (or alterable dimension) function of the palm-rest section of the input device housing has been embodied by a provision of separate grip parts having various dimensions and adapted to be attached to the palm-rest section in an exchangeable manner, or by a provision of a vertically liftable structure for the palm-rest section. That is, the conventional input device having an extendible body is generally provided with a housing capable of enlarging and reducing the dimensions thereof mainly in a height direction in accordance with an operator's requirement. Also, another type of input device with an extendible body has been suggested, wherein a housing is provided with an expandable air bag and the dimensions of a palm-rest section are variable by expanding or shrinking the air bag (see, e.g., Japanese Unexamined Patent Publication (Kokai) No. 10-307679).

In the conventional small-sized input device with the above-described extendible palm-rest section, which is provided with the housing capable of enlarging and reducing the dimensions thereof mainly in the height direction, the position or level of the hand of the operator, used for a data entering operation, is changed from a customary remembered position or level, due to the enlargement or reduction in the dimensions of the palm-rest section. Consequently, there is concern that a sense of incongruity is caused in the data entering operation or stable operability is deteriorated. Also, in the case of using the exchangeable grip parts, problems arise wherein the inventory management of the grip parts as well as the exchanging work of the latter are troublesome and also the attached grip part may be detached from the housing during the data entering operation. Further, in the extendible structure using the air bag, it is possible that the air bag is inadvertently or unexpectedly punctured, which results in a malfunction of the extendible feature of the housing.

On the other hand, it is known, in a small sized input device (or a mouse), that a third entering mechanism is provided for an image shifting or scrolling operation on a display screen, in addition to inherent first and second entering mechanisms, that is, a motion detecting mechanism for a coordinate data directing operation and a switch mechanism for a push-button or click operation. The conventional third entering mechanism includes an operating member having a rotation shaft, a rotation detecting section for detecting a rotation of the rotating shaft, and a resisting section for temporarily changing a drag force against a rotary action of the operating member at certain rotation angles to cause "chattering" which can be felt by a fingertip. The third entering mechanism may be provided further with a switching unit adapted to be actuated in accordance with the press-down operation of the operating member.

In the conventional small-sized input device with the above-described third entering mechanism, there is concern that the resisting section generates noise due to the structural feature thereof to impart chattering to the rotary action of the operating member and thereby the data entering operability is deteriorated. Also, in the case of arranging the switching unit in the third entering mechanism, wherein the switching unit is pushed by the rotation shaft of the operating member when the latter is pressed down, it is possible that the rotation shaft is unexpectedly rotated or slips and thereby the switching or pushing operation for actuating the switching unit becomes unstable.

SUMMARY OF THE INVENTION

It is therefore an object of the present invention to provide an input device, having an extendible body or housing, on which an operator puts his hand for data entering operation, wherein it is possible to alter (i.e., enlarge or reduce) the dimensions of the housing in an easy and stable manner in accordance with the operator's requirement, without deteriorating a data entering operability and causing a malfunction of an extendible feature.

It is another object of the present invention to provide an input device having a third entering mechanism with a rotary operating member, wherein it is possible to effectively and significantly reduce noise generated when the operating member rotates for operation, and it is also possible, if a switching unit is installed, to stably perform a switching or pushing operation for actuating the switching unit.

In accordance with the present invention, there is provided an input device, comprising a housing assembly including a palm-rest section and a base section opposite to the palm-rest section; a switch mechanism accommodated in the housing assembly and including an operating section arranged adjacent to the palm-rest section; and a motion detecting mechanism accommodated in the housing assembly and including a detecting section arranged adjacent to the base section; wherein the housing assembly comprises a plurality of cover members configured by dividing the palm-rest section and the base section into plural parts in a condition where the palm-rest section and the base section are integrally associated with each other; an inner casing at least partially enclosed within the plurality of cover members, the inner casing carrying the switch mechanism and the motion detecting mechanism; and a link arrangement for linking the plurality of cover members with the inner casing, the link arrangement permitting the plurality of cover members to shift relative to each other in a desired direction toward or away from each other.

In this input device, it is preferred that the base section includes a generally flat outer surface, and that the plurality of cover members are shiftable relative to each other in a direction substantially parallel to the outer surface of the base section.

It is also preferred that at least one of the cover members is shiftable together with the operating section of the switch mechanism.

In this arrangement, the input device may further comprise a transmitting member arranged between a switching unit of the switch mechanism carried on the inner casing and the operating section shiftable together with the at least one of the cover members, for transmitting a switching force applied onto the operating section to the switching unit independently of a position of the operating section.

It is also advantageous that the link arrangement includes an interlocking mechanism for interlocking at least two of the cover members with each other.

It is also preferred that the link arrangement includes a catch mechanism for releasably catching a shifting motion of at least one of the cover members relative to the inner casing at a predetermined position.

In this arrangement, the catch mechanism may include an elastic engaging structure provided in association with the inner casing and the at least one of the cover members, and the elastic engaging structure may include a rigid element and an elastic element slidably engaged with the rigid element, the rigid element and the elastic element shifting relative to each other under an elastic deformation of the elastic element to perform a catching action of the predetermined position.

The catch mechanism may further include a release member for forcibly causing the elastic deformation of the elastic element of the elastic engaging structure to release the catching action.

It is also preferred that the input device further comprises an auxiliary entering mechanism carried on the inner casing independently of the switch mechanism and the motion detecting mechanism, wherein the auxiliary entering mechanism includes a rotary operating member partially exposed adjacent to the palm-rest section, at least one of the cover members shifting relative to the rotary operating member.

The present invention also provides an input device, comprising an operating member having a rotation shaft; a rotation detecting section arranged in association with the rotation shaft for detecting a rotation of the operating member; and a resisting section for temporarily changing a drag force against a rotary action of the rotation shaft at a certain rotation angle of the operating member; wherein the resisting section comprises a support member for circumferentially surrounding at least a part of the rotation shaft and rotatably supporting the rotation shaft; a set of engaging members respectively provided to the rotation shaft and the support member, the engaging members being snugly engaged with each other at a certain rotation angle of the rotation shaft; and an elastic member for elastically biasing the support member toward the rotation shaft and ensuring a temporary change of the drag force due to a snug engagement of the engaging members.

In this input device, it is preferred that the support member includes an elastic arm surrounding the rotation shaft in an elastically deformed conditions.

Also, it is advantageous that the input device further comprises a switching unit arranged in association with the rotation shaft, a pushing member rotatably attached to the rotation shaft independently of the resisting section for transmitting a pushing force applied on the operating member to the switching unit to operate the switching unit, and a guide member for guiding the pushing member in a direction generally orthogonal to the rotation shaft.

BRIEF DESCRIPTION OF THE DRAWINGS

The above and other objects, features and advantages of the present invention will become more apparent from the following description of preferred embodiments in connection with the accompanying drawings, in which:

FIG. 23A is a plan view of the modification in the position shown in FIG. 1B;

FIG. 23B is a side view of the modification as shown in FIG. 23A;

FIG. 23C is a front view of the modification as shown in FIG. 23A;

FIG. 23D is a bottom plan view of the modification as shown in FIG. 23A;

DESCRIPTION OF THE PREFERRED EMBODIMENT

Figure 1A:
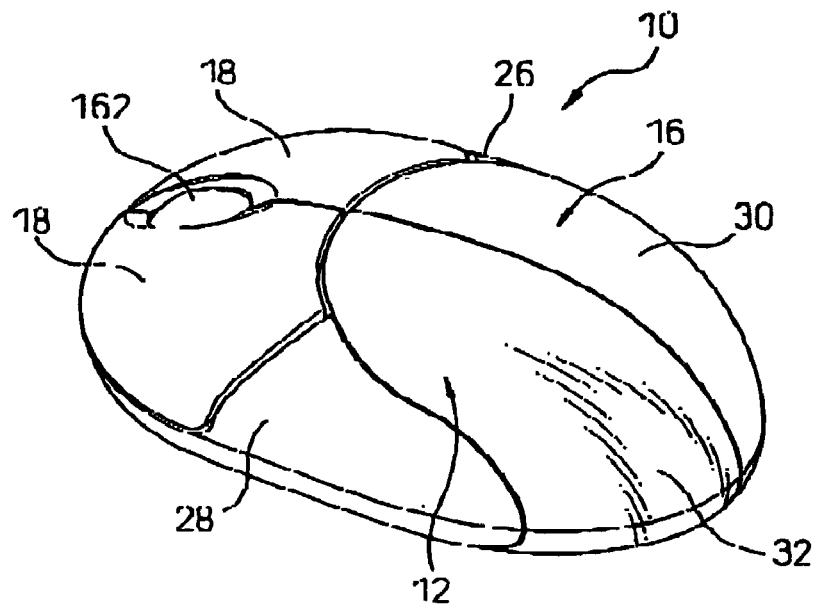
FIG. 1A is a perspective view showing an input device, according to an embodiment of the present invention, with a housing in a reduced-dimension position.
Figure 1B:
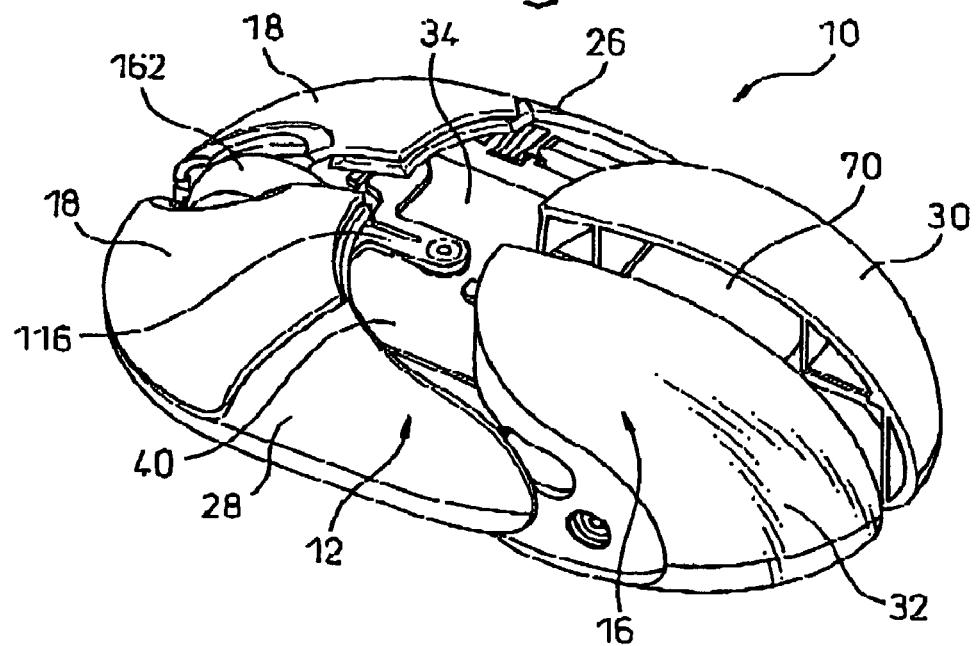
FIG. 1B is a perspective view showing the input device of FIG. 1A, with the housing in an enlarged-dimension position.
Figure 2A:
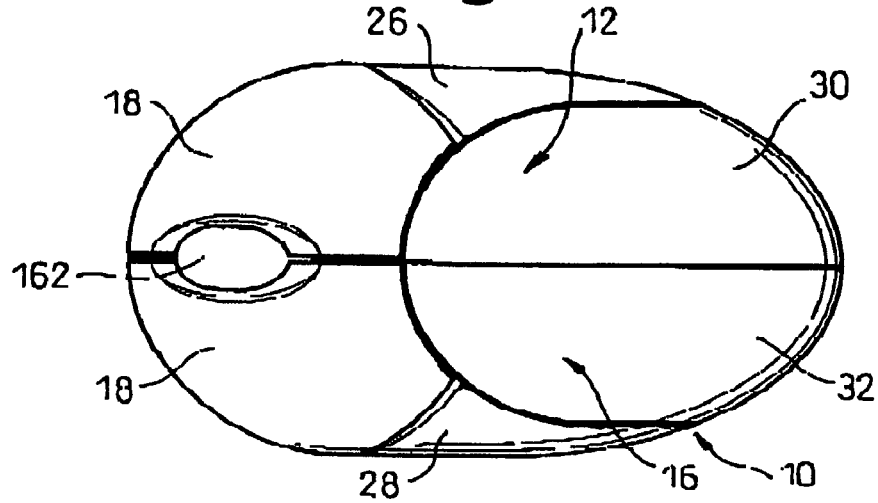
FIG. 2A is a plan view of the input device in the position shown in FIG. 1A.
Figure 2B:
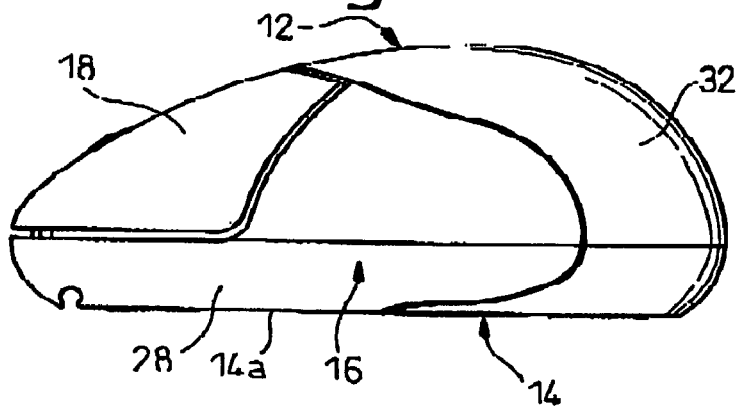
FIG. 2B is a side view of the input device as shown in FIG. 2A.
Figure 2C:
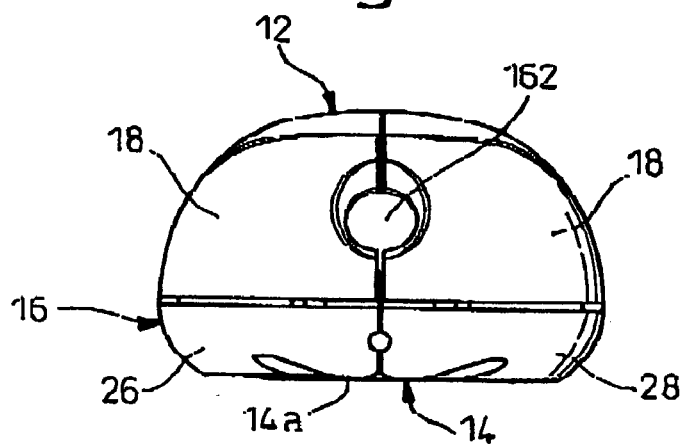
FIG. 2C is a front view of the input device as shown in FIG. 2A.
Figure 3A:
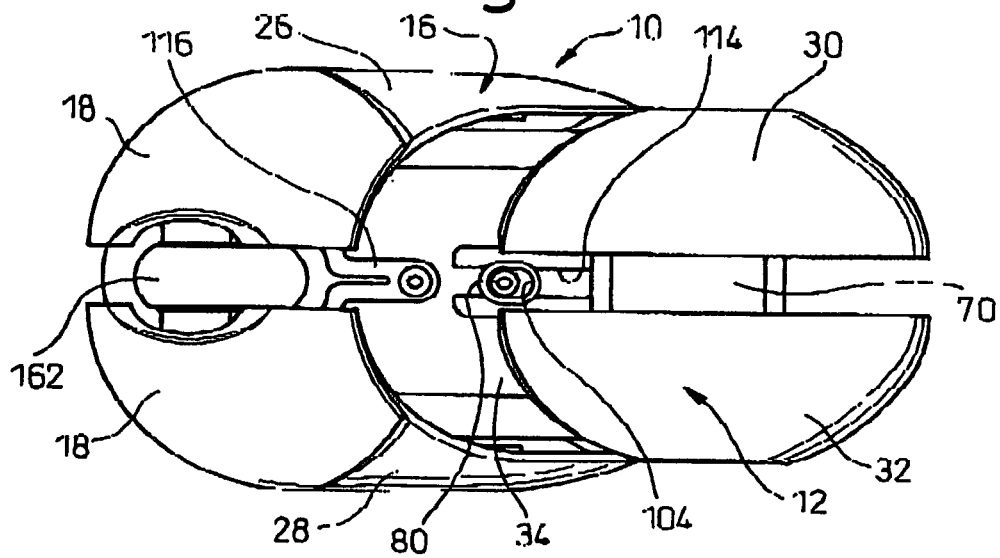
FIG. 3A is a plan view of the input device in the position shown in FIG. 1B.
Figure 3B:
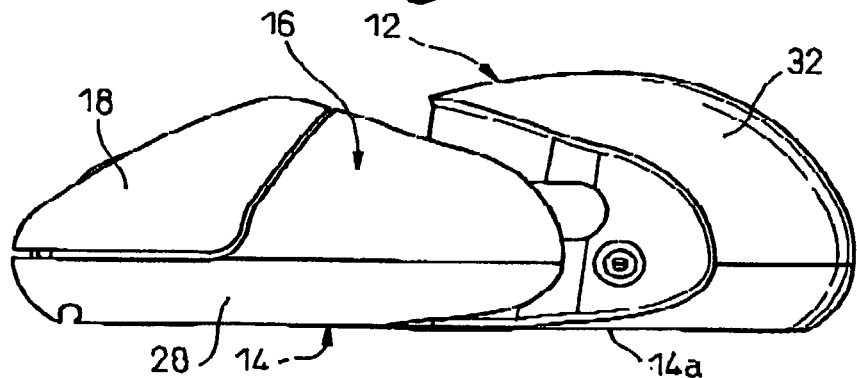
FIG. 3B is a side view of the input device as shown in FIG. 3A.
Figure 3C:
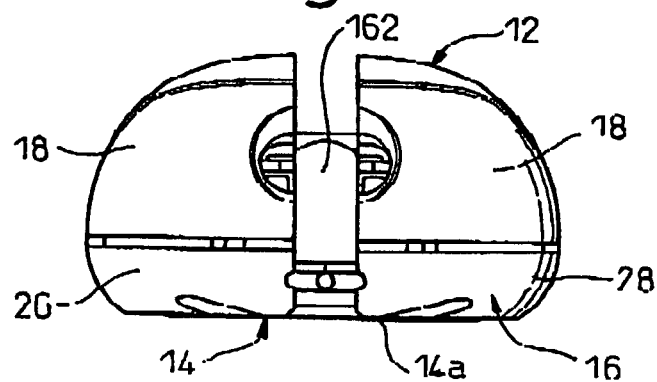
FIG. 3C is a front view of the input device as shown in FIG. 3A.

In the drawings, the same or similar components are denoted by common reference numerals and FIGS. 1A, 2A, 2B, 2C and 4A show an input device 10, according to the first embodiment of the present invention, with an extendible housing thereof in a reduced-dimension or closed position, and FIGS. 1B, 3A, 3B, 3C and 4B show the input device 10 with the housing in an enlarged-dimension or open position. The input device 10 is connectable in an electrical or optical manner for use with digital data processors, such as personal computers, work stations, etc., as a small-sized input device, generally referred to as a mouse, which enables an operator to manually enter analogue-type information so as to direct coordinate data, such as cursor shifting data, on a display screen.

The input device 10 includes a housing assembly 16 operable in a hand-held manner, the housing assembly 16 including a graspable or palm rest section 12, on which an operator puts his hand, and a bottom or base section 14 opposite to the palm-rest section 12; a switch mechanism 20 accommodated in the housing assembly 20, the switch mechanism 20 including an operating section 18 arranged adjacent to the palm-rest section 12; and a motion detecting mechanism 24 accommodated in the housing assembly 20, the motion detecting mechanism 24 including a detecting section 22 arranged adjacent to the base section 14. The housing assembly 16 includes a plurality (four, in the drawing) of cover members 26, 28, 30, 32 configured by dividing the palm-rest section 12 and the base section 14 into plural parts while keeping a condition where the palm-rest section 12 and the base section 14 are integrally or inherently associated with each other; an inner casing 34 at least partially enclosed within the cover members 26, 28, 30, 32, the inner casing 34 carrying the switch mechanism 20 and the motion detecting mechanism 24; and a mechanical link arrangement 36 for linking the cover members 26, 28, 30, 32 with the inner casing 34, the link arrangement 36 permitting the cover members 26, 28, 30, 32 to shift relative to each other in a desired direction toward or away from each other in a selective manner.

The palm-rest section 12 of the housing assembly 16 constitutes an outer surface area, on which an operator puts his hand or palm during a normal operating condition of the input device. The cover members 26, 28, 30, 32 cooperate with each other to present a smoothly curved, egg-shaped profile of the outer surface area of the palm-rest section 12, which permits the housing assembly 16 to be comfortably held or covered by the operator's palm irrespective of the closed/open position of the housing assembly 16. The base section 14 of the housing assembly 16 constitutes another outer surface area, which oppositely faces a surface of an object, on which the input device 10 is placed, during the normal operating condition. The cover members 26, 28, 30, 32 cooperate with each other to present a generally flat profile of the outer surface area of the base section 14, which permits the housing assembly 16 to be stably supported on the objective surface irrespective of the closed/open position of the housing assembly 16. Each cover member 26, 28, 30, 32 having a shell-like profile is provided with a desired rigidity or hardness, and may be integrally molded from a resinous material.

Four cover members 26, 28, 30, 32 are shiftable relative to each other in a direction substantially parallel to the generally flat outer surface 14a of the base section 14 between the housing closed or reduced-dimension position as shown in FIGS. 1A, 2A, 2B, 2C and 4A and the housing open or enlarged-dimension position as shown in FIGS. 1B, 3A, 3B, 3C and 4B. In the housing closed position, the cover members 26, 28, 30, 32 impart a generally gap-free configuration to the palm-rest section 12. In the housing open position, the cover members 26, 28, 30, 32 impart a generally symmetrical cross gap to the palm-rest section 12, which is defined symmetrically in relation to a longitudinally extending centerline of the input device 10. In this manner, the input device 10 is capable of enlarging and reducing in outer dimensions of the housing assembly 16 as a whole in both longitudinal and lateral directions as the occasion demands, relative to the objective surface on which the input device 10 is placed, without varying the height of the palm-rest and base sections 12, 14. In this specification, the terms for explaining certain directions or orientations in connection with the input device 10 are defined for convenience's sake in such a manner that, in the normal operating condition by using an operator's right hand, a fingertip is oriented "frontward", a wrist is oriented "rearward", a thumb is oriented "leftward", a little finger is oriented "rightward", a frontward/rearward direction is called "a longitudinal direction", and a leftward/rightward direction is called "a lateral direction". Also, the palm-rest section 12 of the input device 10 is oriented "upward", the base section 14 is oriented "downward", and an upward/downward direction is called "a height direction".

The switch mechanism 20 includes a pair of push-button switching units 38 (see FIG. 5) for carrying out a left-click operation and a right-click operation. A pair of operating sections 18 are fitted respectively to the "front" cover members 26, 28 at positions adjacent to the palm-rest section 12 for actuating individually the switching units 38 in a mutually independent manner. Each operating section 18 has a shell-like profile and a desired rigidity or hardness, and may be integrally molded from a resinous material. The operating section 18 also presents a smoothly curved, egg-shaped outer surface, which extends substantially flush from the outer surface of the palm-rest section 12, and which permits the operator to rest his fingertip on the operating section 18 in the normal operating condition. The operating sections 18 are disposed so as to respectively cover the front areas of the corresponding cover members 26, 28, and arms 18a formed to project from the respective operating sections 18 extend inside the cover members 26, 28 so as to be attached, at the distal ends of the arms, rotatably to the inner surfaces of the cover members 26, 28. In this manner, each operating section 10 is pivotable in a height direction at a location above the front area of each cover member 26, 28 within a range of a predetermined slight angle.

The motion detecting mechanism 24 is provided with a known optical detecting structure including a light-emitting element, a light-receiving element and an optical system between these elements. The detecting section 22 (FIGS. 4A and 4B) is arranged at one end of the optical system of the motion detecting mechanism 24, and defines, at a location adjacent to the base section 14, a port for passing a detecting light in relation to the objective surface on which the input device 10 is placed in the normal operating condition. The motion detecting mechanism 24 is constructed to detect a moving direction and a moving distance of the input device 10 in itself on the objective surface during a hand-held operation of the operator, and to output a signal in a two-dimensional coordinate system, representing the detected analogue data. It should be noted that the input device according to the present invention does not restrict the motion detecting mechanism to such an optical construction, but may adopt another motion detecting mechanism having a known mechanical structure using, e.g., a ball as a detecting section.

Figure 5:
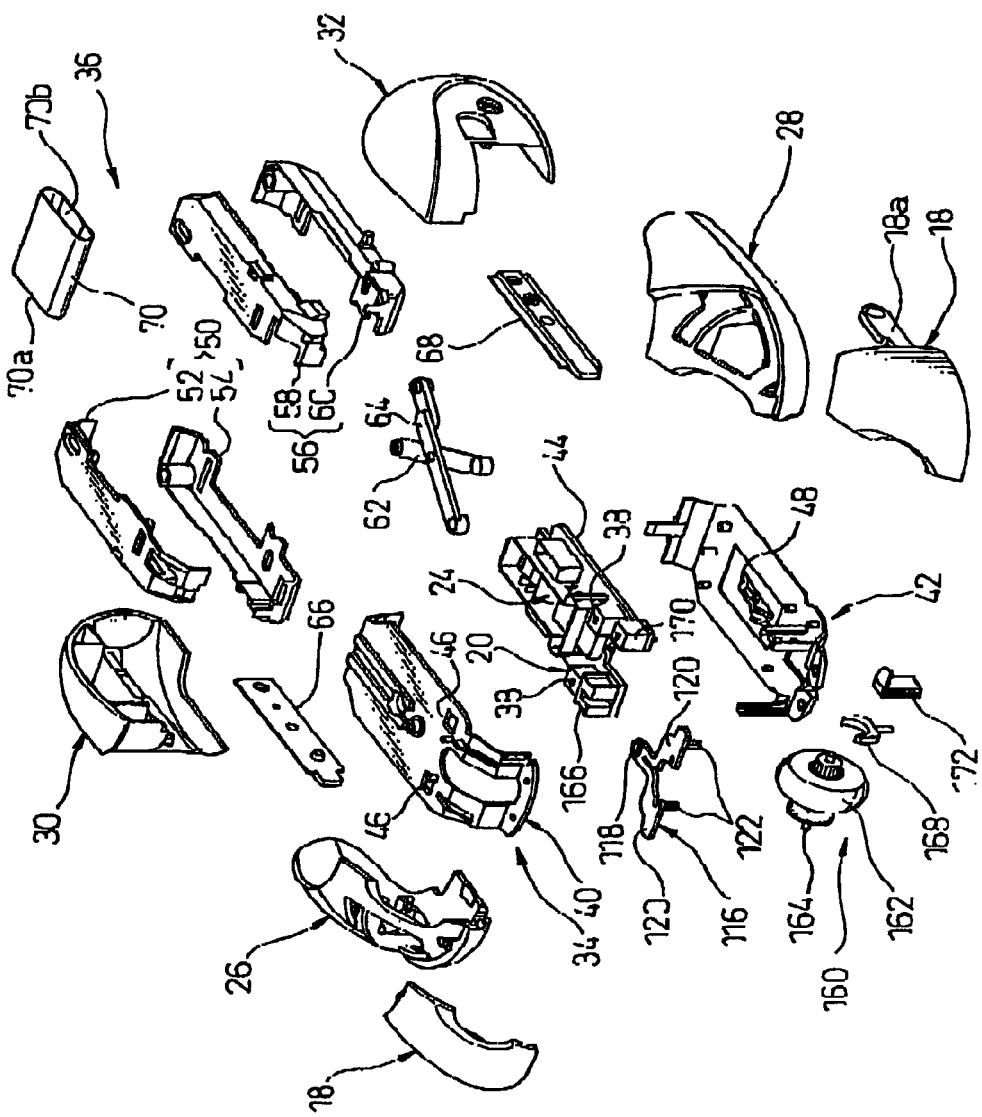
FIG. 5 is an exploded perspective view of the input device.

As shown in FIG. 5, the inner casing 34 includes an upper case part 40 and a lower case part 42, which are assembled integrally with each other. A circuit board 44, on which the major components (the switching units 38, the light-emitting element, the light-receiving element, a CPU, etc.) of the switch mechanism 20 and the motion detecting mechanism 24 are mounted, is fixedly supported between the upper and lower case parts 40, 42. The upper case part 40 is provided, at positions respectively corresponding to the pair of switching units 38 mounted on the circuit board 44, with a pair of apertures 46 formed through the case part, which permits an access to the switching units 38 from the outside of the casing 34. The lower case part 42 is provided, at a position corresponding to the detecting section 22 of the motion detecting mechanism 24 mounted on the circuit board 44, with a window 48 permitting a passing of the detecting light.

Each case part 40, 42 has a plate-like profile and a desired rigidity or hardness, and may be integrally molded from a resinous material. In the reduced-dimension position of the housing assembly 16, the case parts 40, 42 are covered by the cover members 26, 28, 30, 32 except for a peripheral area of the window 48 of the lower case part 42. In the enlarged-dimension position of the housing assembly 16, the further portion of the lower case part 42 and a certain portion of the upper case part 40 are exposed between the cover members 26, 28, 30, 32. Accordingly, from the viewpoint of improving the design properties of the input device 10, at least one of the upper and lower case parts 40, 42 may be made of a transparent or translucent resinous material, or a resinous material containing a fluorescent.

The mechanical link arrangement 36 includes a right movable frame 50 structured by integrally assembling a right-upper frame part 52 with a right-lower frame part 54, a left movable frame 56 structured by integrally assembling a left-upper frame part 58 with a left-lower frame part 60, a pair of link members 62, 64 as an interlocking mechanism for interlocking the shifting motion, in a lateral direction, of the right and left movable frame 50, 56 with each other, a right slider 66 attached slidably in the longitudinal direction to the lateral outer face of the right movable frame 50, a left slider 68 attached slidably in the longitudinal direction to the lateral outer face of the left movable frame 56, and a joint plate 70 as an interlocking mechanism for interlocking the shifting motion, in the longitudinal direction, of the right and left slider 66, 68 with each other. Each of these components of the link arrangement 36 may be integrally molded from a resinous material and is provided with a desired rigidity.

The right movable frame 50 is partially received inside the inner casing 34 shiftably in the lateral direction. The right-front cover member 26 is fixedly joined to the right movable frame 50, and the right-rear cover member 30 fixed to the right slider 66 is connected shiftably in the longitudinal direction through the right slider 66 with the right movable frame 50. Consequently, the front and rear cover members 26, 30 arranged in a right side are capable of shifting together with the right movable frame 50 in the lateral direction relative to the inner casing 34, and the rear cover member 30 is further capable of shifting in the longitudinal direction relative to the inner casing 34 and the front cover member 26.

The left movable frame 56 is partially received inside the inner casing 34 shiftably in the lateral direction. The left-front cover member 28 is fixedly joined to the left movable frame 56, and the left-rear cover member 32 fixed to the left slider 68 is connected shiftably in the longitudinal direction through the left slider 68 with the left movable frame 56. Consequently, the front and rear cover members 28, 32 arranged in a left side are capable of shifting together with the left movable frame 56 in the lateral direction relative to the inner casing 34, and the rear cover member 32 is further capable of shifting in the longitudinal direction relative to the inner casing 34 and the front cover member 28.

Figure 6:
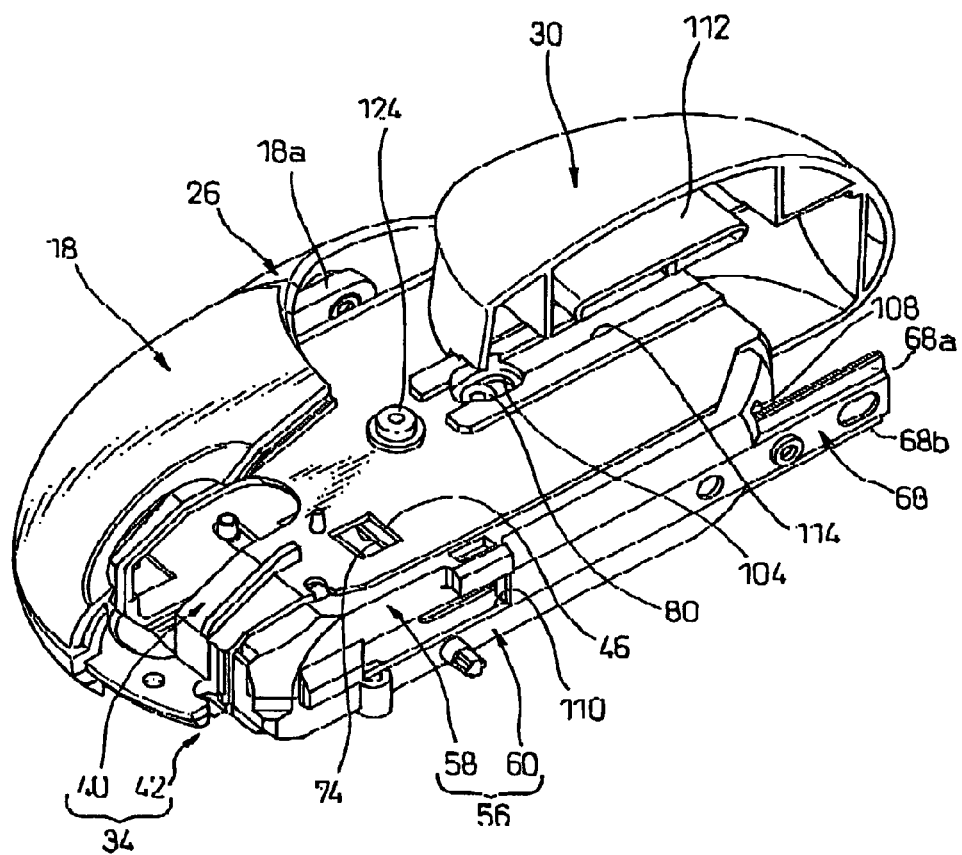
FIG. 6 is a perspective view of the input device in the position shown in FIG. 1B with several parts omitted.

The right-upper frame part 52 of the right movable frame 50 and the left-upper frame part 58 of the left movable frame 56 are arranged within a space defined between the upper case part 40 of the inner casing 34 and the electronic parts mounted on the circuit board 44, shiftably in the lateral direction independently of each other. The right-upper frame part 52 and the left-upper frame part 58 are provided respectively with laterally elongated holes 72, 74 at locations corresponding to the pair of apertures 46 formed in the upper case part 40 (see FIGS. 6 and 7). The holes 72, 74 formed in the upper frame parts 52, 58 are dimensioned so as to create openings between the corresponding apertures 46 of the upper case part 40 and the corresponding switching units 38 on the circuit board 44, over the entire shifting range or travel of the movable frame 50, 56 in the lateral direction. Consequently, each upper frame part 52, 58 does not obstruct the aperture 46 of the upper case part 40 and the switching unit 38 on the circuit board 44 during the lateral shifting motion of the upper frame part.

The right-lower frame part 54 of the right movable frame 50 and the left-lower frame part 60 of the left movable frame 56 are arranged within a gap defined between the lower case part 42 of the inner casing 34 and the circuit board 44, shiftably in the lateral direction independently of each other. The right-lower frame part 54 and the left-lower frame part 60 are provided respectively with longitudinally elongated cutouts 76, 78 at locations corresponding to the window 48 formed in the lower case part 42 (see FIG. 8). The cutouts 76, 78 formed in the lower frame parts 54, 60 are dimensioned so as to create an opening between the window 48 of the lower case part 42 and the optical element of the motion detecting mechanism 24 mounted on the circuit board 44 at a position above the window 48, over the entire shifting range or travel of the movable frame 50, 56 in the lateral direction. Consequently, each lower frame part 54, 60 does not interfere with the window 40 of the lower case part 42 or the optical element on the circuit board 44 during the lateral shifting motion of the lower frame part.

Figure 7:
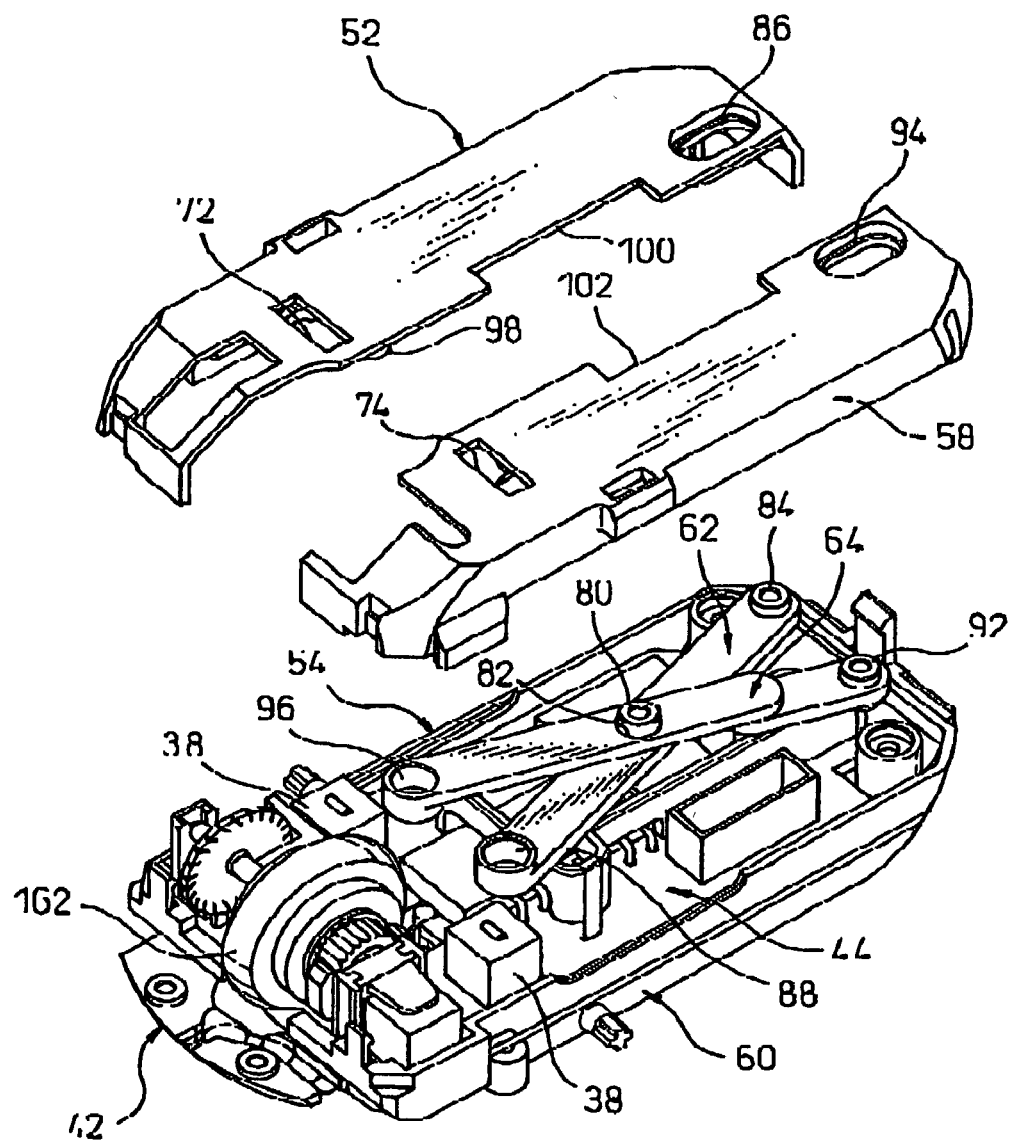
FIG. 7 is an exploded perspective view of the input device with several parts omitted.
Figure 8:
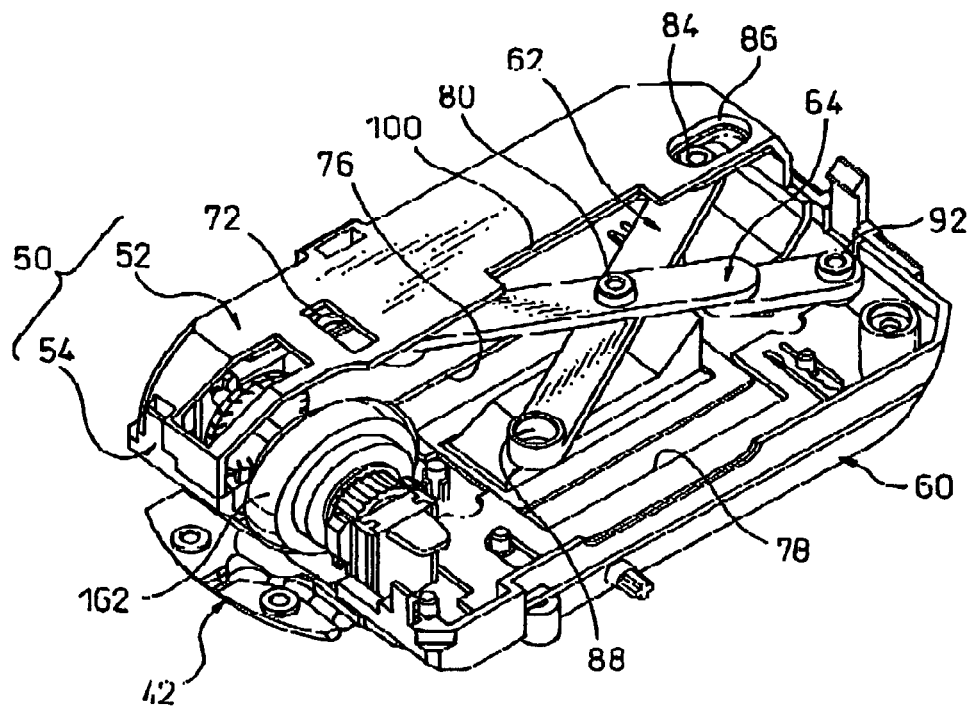
FIG. 8 is a perspective view of the input device with several parts omitted.

As shown in FIGS. 7 and 8, the pair of link members 62, 64 are pivotably assembled together in an X-configuration, by fitting a pivot 80 formed on the bar shaped first link member 62 at a generally longitudinal center thereof into a bearing bore 82 formed in the bar-shaped second link member 64 at a generally longitudinal center thereof. The first link member 62 serves to link the right movable frame 50 with the left movable frame 56 movably relative to each other, by fitting a cylindrical projection 84 formed on the link member 62 at one longitudinal end thereof into an oblong guide hole 86 formed in the right-upper frame part 52 near the rear end thereof in a rotatable and longitudinally slidable manner, and by fitting a cylindrical projection 90 (see FIG. 13) formed inside the left-upper frame part 58 near the hole 74 thereof into a bearing hole 88 formed on the link member 62 at another longitudinal end thereof in a rotatable manner. The second link member 64 serves to link the right movable frame 50 with the left movable frame 56 movably relative to each other, by fitting a cylindrical projection 92 formed on the link member 64 at one longitudinal end thereof into an oblong guide hole 94 formed in the left-upper frame part 58 near the rear end thereof in a rotatable and longitudinally slidable manner, and by fitting a cylindrical projection 98 formed inside the right-upper frame part 52 near the hole 72 thereof into a bearing hole 96 formed in the link member 64 at another longitudinal end thereof in a rotatable manner.

The pivot 80, acting as a rotational center of the link members 62, 64 assembled together in the X-configuration, extends through cutouts 100, 102 formed in the upper frame parts 52, 58 to project outward therefrom, and is fitted into an oblong bearing hole 104 (see FIGS. 3A and 6) formed in the upper case part 40 of the inner casing 34 at a generally center thereof in a rotatable and longitudinally slidable manner. Consequently, the link members 62, 64 are joined to the inner casing 34 in such a manner as to hold the pivot 80 as the rotation center in an immovable state in the lateral direction, so that the link members 62, 64 interlock the right movable frame 50 with the left movable frame 56 through the cylindrical projections 84, 92 and the bearing hole 88, 96 provided at the respective longitudinal ends of the link members in such as way as to permit the movable frames 50, 56 to shift in the lateral direction in a synchronized manner, i.e., in mutually opposite directions by an identical distance. As a result, the right-front and right-rear cover members 26, 30 attached to the right movable frame 50 and the left-front and left-rear cover members 28, 32 attached to the left movable frame 56 are interlocked with each other to shift in the lateral direction relative to the inner casing 34, in a synchronized manner, i.e., in mutually opposite directions by an identical distance.

Figure 9:
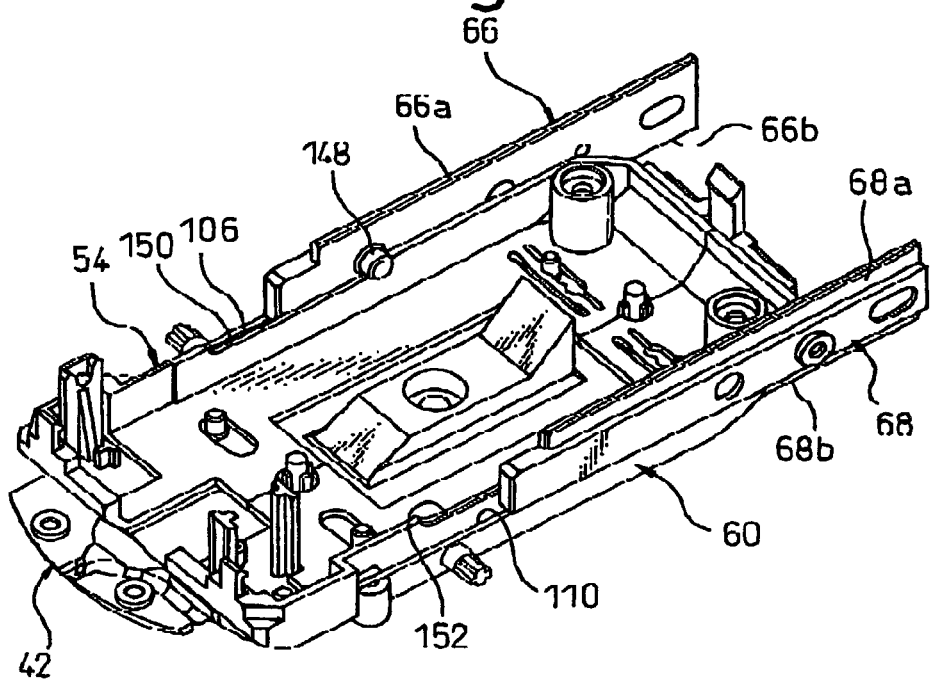
FIG. 9 is a perspective view of the input device with several parts omitted.

As shown in FIG. 9, the right and left sliders 66, 68 are provided respectively with flat plate bodies and thinner sliding portions 66a, 66b, 68a, 68b formed along longitudinally extending opposite edges of the flat plate bodies. The right slider 66 is attached to the lateral outer face of the right movable frame 50 in a slidable manner in the longitudinal direction, in a condition where the upper sliding portion 66a is slidably inserted into a slit (not shown) formed on the outer face of the right-upper frame part 52 and the lower sliding portion 66b is slidably inserted into a slit 106 formed on the outer face of the right-lower frame part 54. The left slider 68 is attached to the lateral outer face of the left movable frame 56 in a slidable manner in the longitudinal direction, in a condition where the upper sliding portion 60a is slidably inserted into a slit 108 (see FIG. 6) formed on the outer face of the left-upper frame part 58 and the lower sliding portion 68b is slidably inserted into a slit 110 formed on the outer face of the left lower frame part 60.

Figure 10:
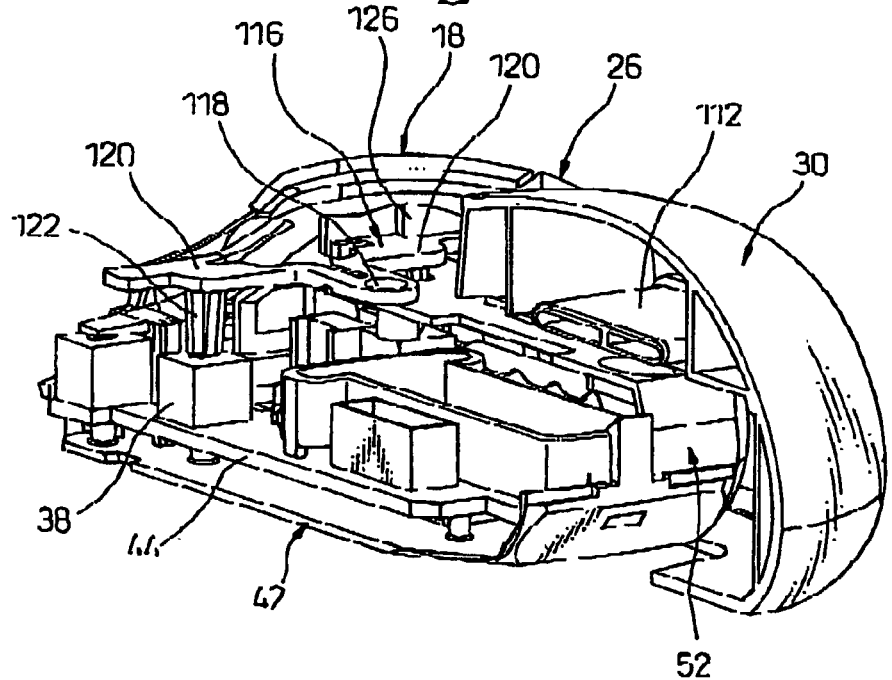
FIG. 10 is a perspective view of the input device with several parts omitted.

The joint plate 70, as a flat, hollow tubular member as shown in FIG. 5, is structured to slidably receive, in one open end 70a thereof, a joint piece 112 (see FIGS. 6 and 10) projecting on the inner face of the right-rear cover member 30 as well as, in another open end 70b, a joint piece (not shown) projecting similarly on the inner face of the left-rear cover member 32. Consequently, the joint plate 70 interlocks the right-rear cover member 30 with the left-rear cover member 32 in such a way as to permit the cover members 30, 32 to shift in the longitudinal direction relative to the inner casing 34 and the front cover members 26, 28, in a synchronized manner, i.e., in an identical direction by an identical distance. As a result, the joint plate 70 interlocks the longitudinal shifting motions of the right and left sliders 66, 68 with each other.

The joint plate 70 is engaged with the joint pieces 112 of the right and left rear cover members 30, 32 in a slidable manner, so as not to interfere with the lateral shifting motions of the cover members 30, 32. The joint plate 70 may be provided with a protrusion (not shown) which is slidably engageable with a longitudinal groove 114 (FIGS. 3A and 6) formed on the upper surface of the upper case part 40 of the inner casing 34 adjacent to the bearing hole 104. According to this structure, the joint plate 70 is centered relative to the longitudinal groove 114 on the inner casing 34, irrespective of the longitudinal and lateral shifted positions of the cover members 30, 32, and therefore the joint plate 70 is prevented from inadvertently coming out of the cover members 30, 32 even when the cover members 30, 32 are shifted to be spaced from each other at a maximum distance.

In the input device 10 as described above, it is possible to shift a right pair of front and rear cover members 26, 30 and a left pair of front and rear cover members 28, 32 in the lateral direction relative to the inner casing 34, in a synchronized manner, i.e., in opposite directions by an identical distance. Further, independently of this lateral movement, it is possible to shift a rear pair of right and left cover members 30, 32 in the longitudinal direction relative to a front pair of right and left cover members 26, 28, in a synchronized manner, i.e., in an identical direction by an identical distance. Accordingly, it is possible for the input device 10 to alter (i.e., enlarge or reduce) the external dimensions of the housing assembly 16, in accordance with the operator's requirement, to a desired extent in at least one of longitudinal and lateral directions, without changing the height of the palm-rest and base sections 12, 14 in relation to the objective surface on which the input device 10 is placed.

Incidentally, when the input device 10 is handled to enlarge or reduce the dimensions of the housing assembly 16 in the lateral direction, the front pair of right and left cover members 26, 28 are respectively shifted together with the associated operating sections 18 of the switch mechanism 20 in the lateral direction relative to the inner casing 34. Consequently, the positional correlation between each operating section 18 and the associated switching unit 38 carried on the inner casing 34 is varied in accordance with the shifting motion of each cover member 26, 28. Under these circumstances, in order to ensure the correct actuation of the switching unit 38 by the normal push-down operation of the operating section 18, the input device 10 further includes a transmitting member 116, arranged between the pair of operating sections 18 and the pair of switching units 38 in the switch mechanism 20, for transmitting a switching force applied onto each operating section 18 to the associated switching unit 38 independently of the shifted position, in the lateral direction, of the operating section 18 (see FIGS. 1B, 5 and 10).

The transmitting member 116, which may be integrally molded from a resinous material, includes a central fixture 118, a pair of lateral arms 120 having desired elasticity and extending oppositely and symmetrically from the central fixture 118, and a pair of vertical legs 122 respectively projecting downward from the distal free end regions of the arms 120. The transmitting member 116 is attached to the inner casing 34 in a state where the fixture 118 is securely fitted to a projection 124 (see FIG. 6) projecting from the upper case part 40 of the inner casing 34 at a generally center thereof adjacent to the bearing hole 104, and where the legs 122 are respectively inserted, movably in the height direction, through the apertures 46 in the upper case part 40 as well as the holes 72, 74 in the upper pair of right and left frame parts 52, 58. In this state, the arms 120 of the transmitting member 116 are positioned beneath pressing pieces 126 (FIG. 10) which are formed to project respectively on the lower side of the operating sections 18 and extend through the associated cover members 26, 28. Also, the legs 122 of the transmitting member 116 are located at positions where the distal ends thereof are respectively abutted to the movable elements of the corresponding switching units 38 mounted on the circuit board 44 in the inner casing 34 (see FIG. 10).

Each arm 120 of the transmitting member 116 has a laterally extending shape which enables the arm 120 to be maintained in slidable contact with the lower end of the pressing piece 126 of the operating section 18, over the entire range of the lateral shifting motion of each cover member 26, 28 together with the associated operating section 18 relative to the inner casing 34. Consequently, the transmitting member 116 is capable of correctly receiving a push-down force for switching operation, applied onto each operating section 18, on the associated arm 120, and transmitting it to the associated switching unit 38 through the left 122, independently of the lateral shifted position of each cover member 26, 28 carrying the operating section 18 as pushed, and thereby the switching unit 38 is correctly actuated. Moreover, each arm 120 of the transmitting member 116 elastically retains the operating section 18 at an inoperative position above the cover member 26, 28, due to the elastic restoring force of the arm 120 and the inherent elastic recovery force of the movable element of the switching unit 38.

In the input device 10 having the above construction, the shifting motion of four cover members 26, 28, 30, 32 for enlarging/reducing housing dimensions may be performed in a step-less mode, or alternatively in a stepped mode. For the stepped mode of the housing dimension change, it is advantageous that the mechanical link arrangement 36 further includes a temporary catch mechanism for releasably catching or stopping the shifting motion of at least one of the cover members 26, 28, 30, 32 relative to the inner casing 34 at a predetermined position.

Figure 11A:
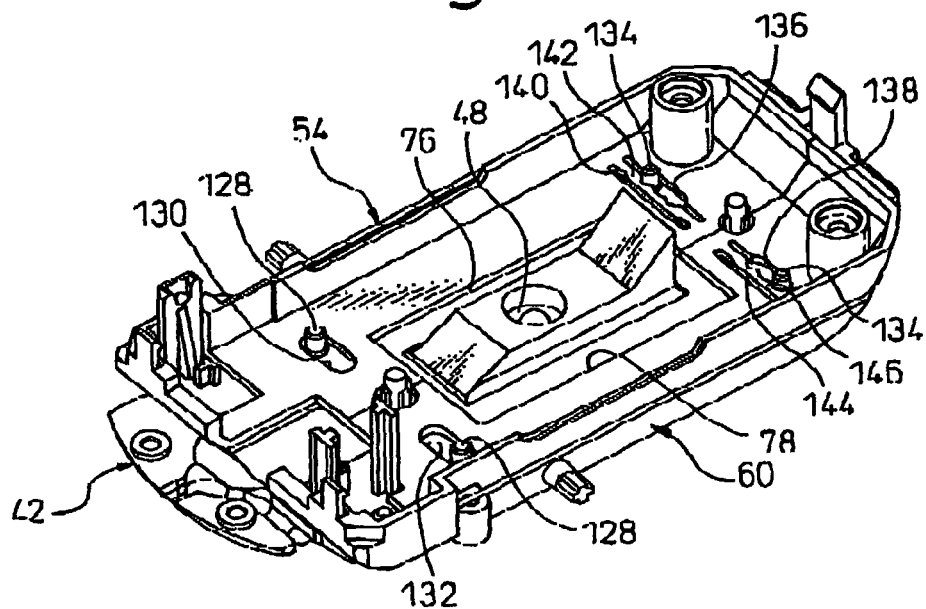
FIG. 11A is a perspective view of the input device as shown in FIG. 1A with several parts omitted.
Figure 11B:
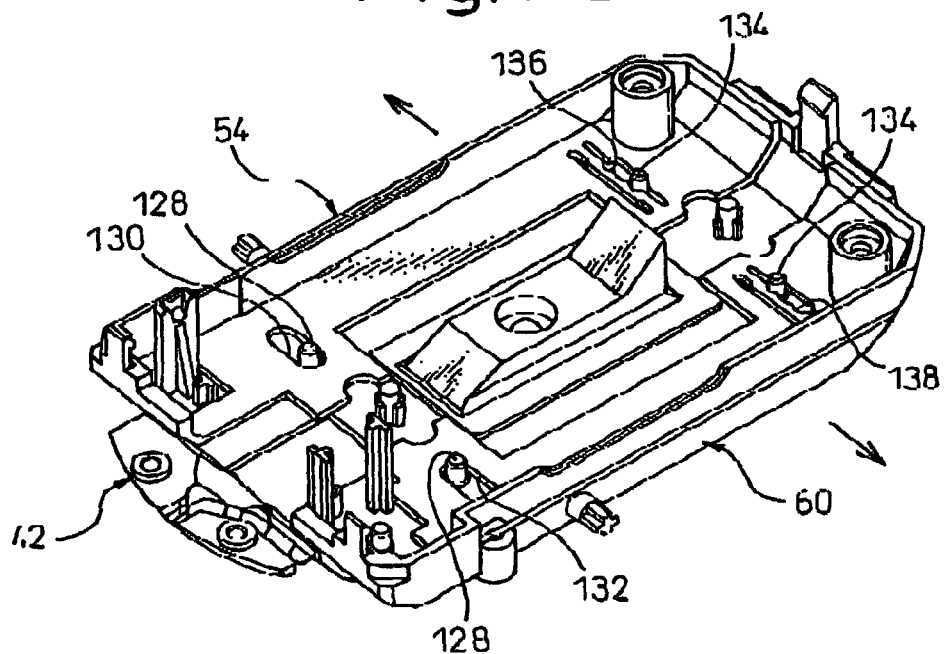
FIG. 11B is a perspective view of the input device as shown in FIG. 1B with several parts omitted.

The temporary catch mechanism may be embodied, as shown for example in FIGS. 11A and 11B, by an elastic engaging structure (engaging pins 134, catching holes 136, 138, slots 140, 144, elastic beams 142, 146) provided between the lower case part 42 of the inner casing 34 and the lower pair of right and left frame parts 54, 60 of the right and left movable frames 50, 56, in addition to a guide structure (guide pins 128, guide holes 130, 132) for guiding the frame parts 54, 60 in the lateral direction. The elastic engaging structure includes a rigid element (the engaging pins 134) and an elastic element (the elastic beams 143, 146), provided respectively in association with the inner casing 34 and each cover member 26, 28, 30, 32. The rigid and elastic elements act to slide relative to each other under the elastic deformation of the elastic element, so as to perform an elastically catching or stopping action at the predetermined position.

More specifically, the lower case part 42 is provided on the upper side thereof with a pair of guide pins 128 uprightly formed at laterally symmetric positions in front of the window 48 and a pair of engaging pins 134 uprightly formed at laterally symmetric positions in back of the window 48. Corresponding to this arrangement, the right-lower frame part 54 is provided with a laterally oblong elliptical guide hole 130 opened at a position in front of the cutout 76 and a laterally oblong elliptical catching hole 136 opened at a position in back of the cutout 76 to define a corrugated edge 136a (see FIG. 12A). Further, a slot 140 extending parallel to the catching hole 136 is formed to open at a position close to the corrugated edge 136a of the catching hole 136, so as to define an elastic beam 142 arranged adjacent to the catching hole 136. In the same way, the left-lower frame part 60 is provided with a laterally oblong elliptical guide hole 132 opened at a position in front of the cutout 78 and a laterally oblong elliptical catching hole 138 opened at a position in back of the cutout 78 to define a corrugated edge 138a (see FIG. 12A). Further, a slot 144 extending parallel to the catching hole 138 is formed to open at a position close to the corrugated edge 138a of the catching hole 138, so as to define an elastic beam 146 arranged adjacent to the catching hole 138. The guide pins 128 and the engaging pins 134, formed on the lower case part 42, are respectively received in the corresponding guide holes 130, 132 and catching holes 136, 138, formed in the right-lower and left-lower frame parts 54, 60, movably relative to each other in the lateral direction.

Figure 12A:
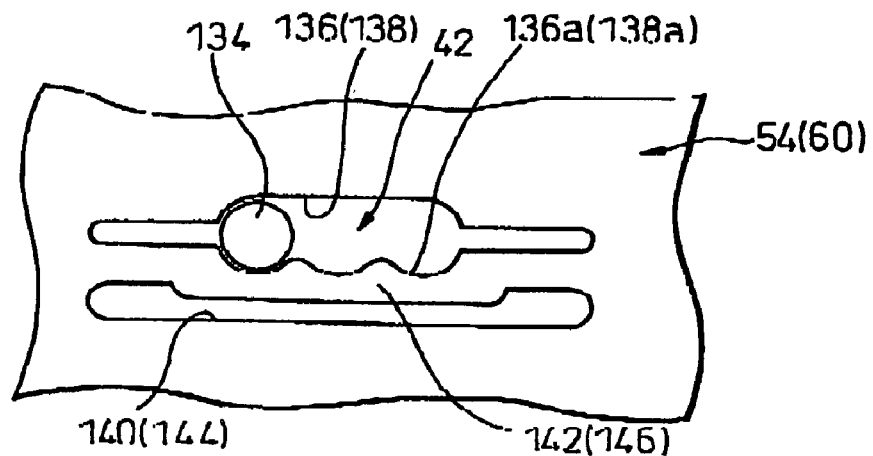
FIG. 12A illustrates an operation of a catch mechanism of the input device in the position shown in FIG. 1A.
Figure 12B:
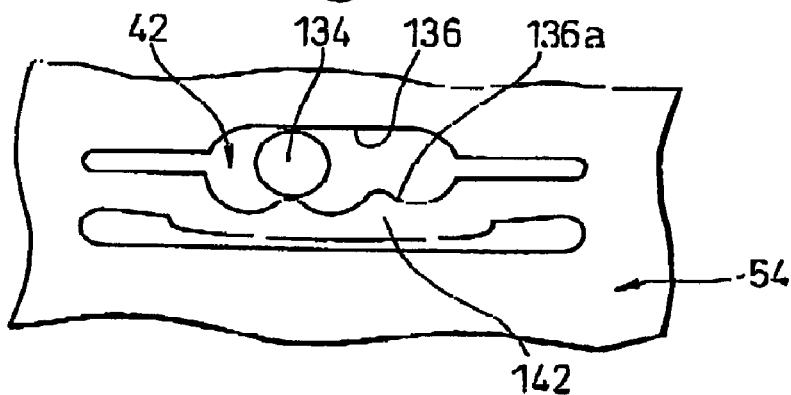
FIG. 12B illustrates the operation of the catch mechanism in an intermediate position.
Figure 12C:
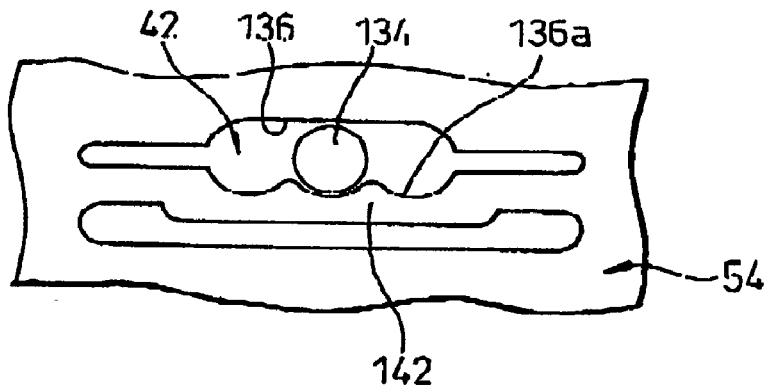
FIG. 12C illustrates the operation of the catch mechanism in the position shown in FIG. 1B.

Referring now to FIGS. 12A and 12C, the mode of operation of the elastic engaging structure is exemplarily described in association with the right-lower frame part 54. First, in the reduced-dimension or closed position of the housing, the engaging pin 134 formed on the lower case part 42 is received on a right-end (left-end, in the drawing) recess of the corrugated edge 136a in the catching hole 136 formed in the right-lower frame part 54 (FIG. 12A). In this state, the engaging pin 134 is caught or held at a right-limit position in the catching hole 136 due to the function of the elastic beam 142, and thereby the right-lower frame part 54 (or the right movable frame 50) is retained at the housing closed position on the lower case part 42 (or the inner casing 34). When the right movable frame 50 is shifted in the lateral direction from the housing closed position, the engaging pin 134 starts to slide over a bulge of the corrugated edge 136a of the catching hole 136 while elastically deforming the elastic beam 142 (FIG. 12D), and thereafter is received on an intermediate recess of the corrugated edge 136a of the catching hole 136 while being accompanied by the elastic restoration of the elastic beam 142 (FIG. 12C). In this state, the engaging pin 134 is caught or held at an intermediate position in the catching hole 136 due to the function of the elastic beam 142, and thereby the right-lower frame part 54 (or the right movable frame 50) is retained at an intermediate position between the closed (or reduced-dimension) position and open (or enlarged-dimension) position of the housing on the lower case part 42 (or the inner casing 34).

According to the above configuration of the elastic engaging structure, it is possible to shift the pair of front and rear cover members 26, 30 associated with the right-lower frame part 54, as well as the pair of front and rear cover members 28, 32 associated with the left-lower frame part 60, relative to the inner casing 34 in a step-by-step manner in the lateral direction, between the housing reduced-dimension position (FIG. 11A) and the housing enlarged-dimension position (FIG. 11B). In the above configuration, both the guide pins 128 of the guide structure and the engaging pins 134 of the elastic engaging structure also serve as columns for supporting the circuit board 44 at a predetermined position within the inner casing 34.

In addition, it is possible to construct the rear cover members 30, 32 so as to be shiftable in a stepping mode in the longitudinal direction relative to the front cover members 26, 28, by adopting another elastic engaging structure similar to the above-described structure. In this arrangement, it is preferred that elastic engaging structures generally identical to each other are provided respectively for the right-rear cover member 30 and the left-rear cover member 32.

More specifically, as shown in FIG. 9, the right slider 66 is provided on the inner side thereof, facing opposite to the right movable frame 50, with one engaging pin 148 (as a rigid element) uprightly formed at a predetermined position. Corresponding to this arrangement, the right-lower frame part 54 is provided with a longitudinally oblong cutout 150 at a predetermined position on the outer periphery thereof adjacent to the slit 106. Further, although not shown in the drawings, the right-upper frame part 52 is provided with a cutout defined with a longitudinally extending corrugated edge at a position corresponding to the cutout 150 of the right-lower frame part 54, and a slot extending parallel to the cutout of the frame part 52 to open at a position close to the corrugated edge, so as to define an elastic beam (as an elastic element) arranged adjacent to the cutout. The engaging pin 148 formed on the right slider 66 is received in a catching hole, defined by the cutout 150 of the right-lower frame part 54 and the cutout of the right-upper frame part 52, movably relative to each other in the longitudinal direction.

Figure 13:
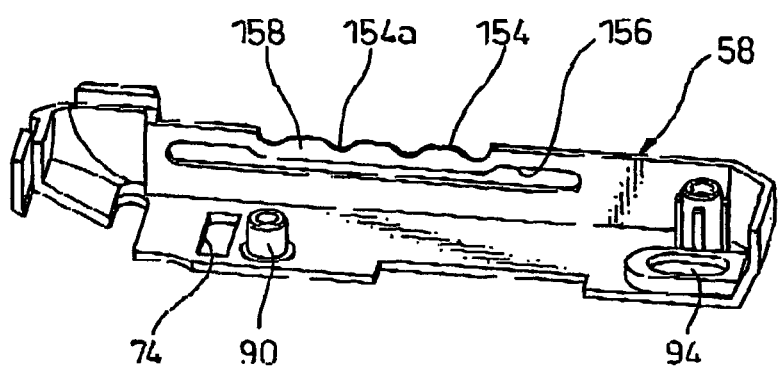
FIG. 13 is a perspective view showing another catch mechanism.

In the same way, the left slider 68 is provided on the inner side thereof, facing opposite to the left movable frame 56, with a not-shown single engaging pin (as a rigid element) uprightly formed at a predetermined position. Corresponding to this arrangement, the left-lower frame part 60 is provided with a longitudinally oblong cutout 152 at a predetermined position on the outer periphery thereof adjacent to the slit 110. Further, as shown in FIG. 13, the left-upper frame part 58 is provided with a cutout 154 defined with a longitudinally extending corrugated edge 154a at a position corresponding to the cutout 152 of the left-lower frame part 60, and a slot 156 extending parallel to the cutout 154 to open at a position close to the corrugated edge 154a, so as to define an elastic beam 158 (as an elastic element) arranged adjacent to the cutout 154. The engaging pin formed on the left slider 68 is received in a catching hole, defined by the cutout 152 of the left-lower frame part 60 and the cutout 154 of the left-upper frame part 58, movably relative to each other in the longitudinal direction.

The elastic engaging structure having the above configuration functions in a manner similar to the elastic engaging structure as described in relation to FIGS. 12A to 12C. Consequently, it is possible to shift the rear cover member 30 fixed to the right slider 66 relative to the front cover member 26 secured to the right movable frame 50 in a step-by-step manner in the longitudinal direction, between the housing reduced-dimension position and the housing enlarged-dimension position. Also, it is possible to shift the rear cover member 32 fixed to the left slider 68 relative to the front cover member 28 secured to the left movable frame 56 in a step-by-step manner in the longitudinal direction, between the housing reduced dimension position and the housing enlarged-dimension position.

The input device 10 is further provided with a third or auxiliary entering mechanism 160 carried on the inner casing 34 independently of the switch mechanism 20 and the motion detecting mechanism 24 (see FIG. 5). The auxiliary entering mechanism 160 includes a rotary operating member 162 partially exposed adjacent to the palm-rest section 12 between the pair of operating sections 18. In the illustrated input device 10, four cover members 26, 28, 30, 32 are capable of shifting relative to the rotary operating member 162 between the housing reduced-dimension position and the housing enlarged-dimension position (see FIGS. 1A to 3C).

As shown in FIG. 5, the auxiliary entering mechanism 160 includes the wheel-shaped operating member 162 having a rotation shaft 164, a rotation detecting section 166 with an optical system, arranged in association with the rotation shaft 164 for detecting a rotation of the rotation shaft 164 of the operating member 162, a resisting section 168 for temporarily changing a drag force against a rotary action of the rotation shaft 164 of the operating member 162 at every certain rotation angles to cause "chattering" which can be felt by a fingertip, a push-button switching unit 170 adapted to be actuated in accordance with the press-down operation of the operating member 162, and a pushing member 172 transmitting a pushing force applied on the operating member 162 to the switching unit 170 to operate the switching unit 170. The operating member 162, the resisting section 168 and the pushing member 172 are carried on the lower case part 42 of the inner casing 34, while the optical system of the rotation detecting section 166 and the switching unit 170 are mounted to the circuit board 44 accommodated in the inner casing 34. The auxiliary entering mechanism 160 is used for entering data corresponding to the rotation angle of the operating member 162, so as to perform, e.g., an image shifting or scrolling operation on a display screen. The further detail of the auxiliary entering mechanism 160 is described later.

Figure 4A:
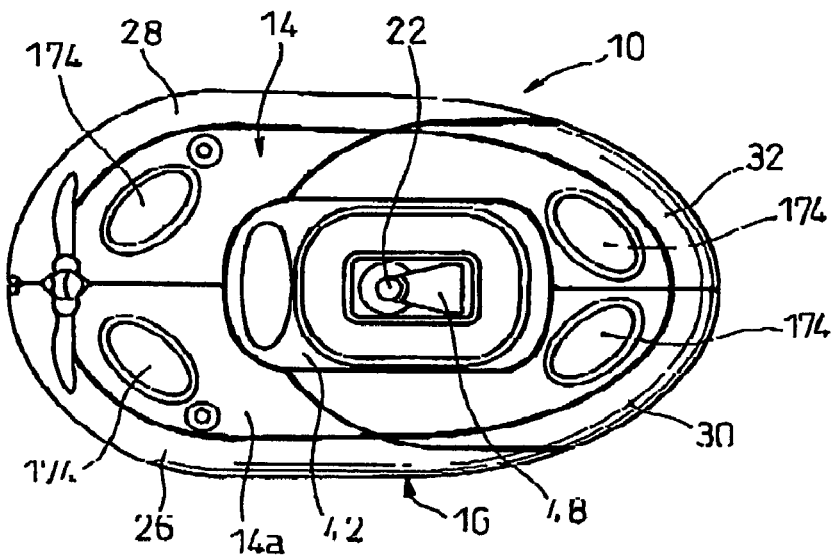
FIG. 4A is a bottom plan view of the input device as shown in FIG. 2A.
Figure 4B:
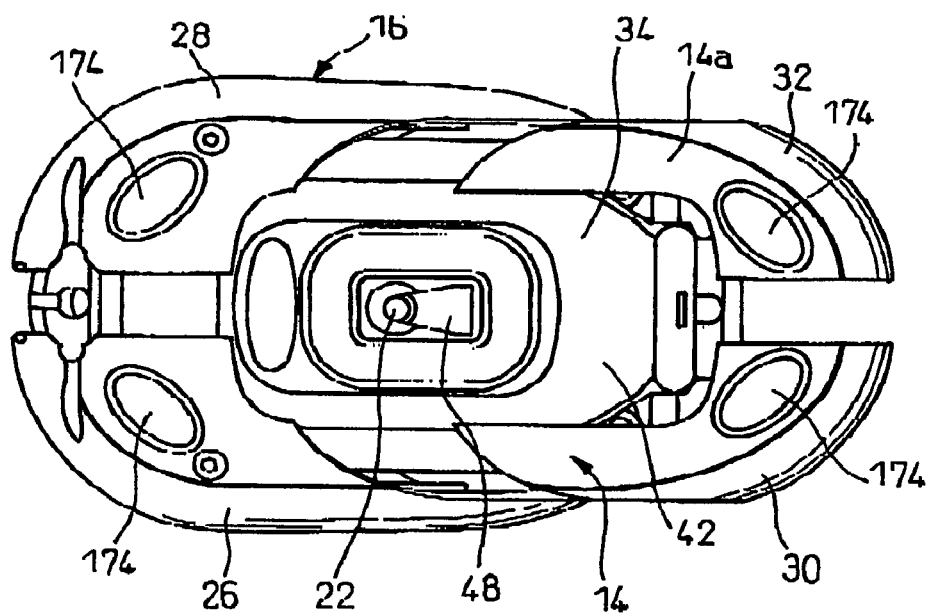
FIG. 4B is a bottom plan view of the input device as shown in FIG. 3A.

In the input device 10 having the above described structure, all of four cover members 26, 28, 30, 32 are provided, on the respective surface areas mutually cooperating to form the generally flat outer surface 14*a* of the base section 14, with sliding contact faces 174 slightly protuberant from the surface areas (FIG. 4A). The sliding-contact faces 174 of the respective cover members 26, 28, 30, 32 slide under a direct contact on the objective surface, on which the input device 10 is placed, to create a slight gap between the objective surface and the outer surface 14*a* of the base section 14, during the data entering operation especially in the motion detecting mechanism 24 of the input device 10. As a result, it is possible to effectively reduce frictional resistance generated from the objective surface against the input device 10 during the data entering operation. Also, when the sliding-contact faces 174 are made of a material possessing superior wear resistance, different from the material of the outer surface 14*a* of the base section 14, it is possible to prevent the outer surface 14*a* from being worn due to the data entering operation. Moreover, when the sliding-contact faces 174 are disposed at balanced positions on all of four cover members 26, 28, 30, 32, it is possible to move the housing assembly 16 for operation in a stable manner along the objective surface, irrespective of the altered (i.e., enlarged or reduced) condition or dimension of the housing assembly 16.

As will be understood from the above description, in the input device 10, even when the palm-rest section 12 of the housing assembly 16 is handled to be enlarged or reduced in dimensions thereof, the housing assembly 16 is not changed in dimension in the height direction, so that the position or level of the palm or hand of the operator, used for the data entering operation, is maintained at a customary remembered position or level. Consequently, a sense of incongruity in the data entering operation and a deterioration in stable operability is avoidable, in the entire range of a change in dimensions of the housing assembly 16. Also, it is possible to impart the desired external dimensions, just fitting the operator's palm size, to the housing assembly 16, without using any separate parts such as exchangeable grip parts. Further, the mechanical link arrangement 36 having a relatively simple structure and a high functional reliability is adopted to a housing-dimension changing section, while eliminating the use of a fragile member such as an air bag, and thereby it is possible to accurately alter (i.e., enlarge or reduce) the dimensions of the housing in an easy and stable manner.

It will be appreciated that the interlocking mechanism in the above-described mechanical link arrangement 36, which is constituted from the pair of link members 62, 64, the joint plate 70 and so forth, is an optional feature capable of being optionally installed in the input device while considering a good balance between the improvement of the altering operability in dimension of the housing assembly 16 and the simplification of the altering mechanism for the housing dimension. Therefore, at least one of the link member pair 62, 64 and the joint plate 70 may be omitted, so as to improve a degree of freedom of the respective shifting motions of the cover members 26, 28, 30, 32. Also, certain features, such as the number of shiftable cover members or the configuration of the mechanical link arrangement for shiftable linking the cover members to the inner casing, are not limited to those in the illustrated embodiment but may be variously modified therefrom.

Figure 14:
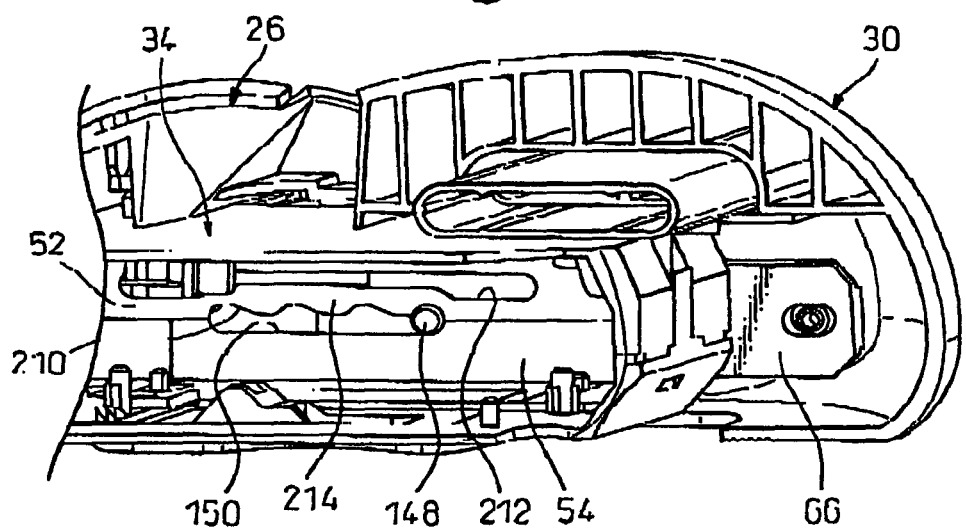
FIG. 14 shows a modification of the catch mechanism.
Figure 15A:
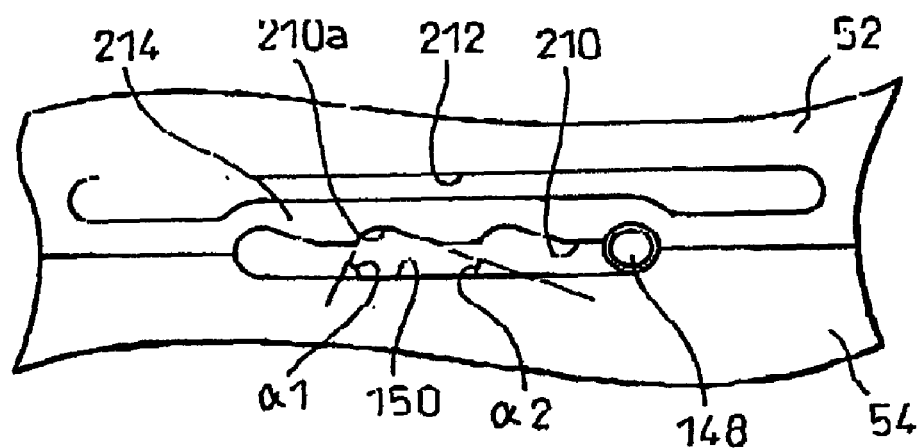
FIG. 15A is an enlarged illustration of the catch mechanism of FIG. 14.
Figure 15B:
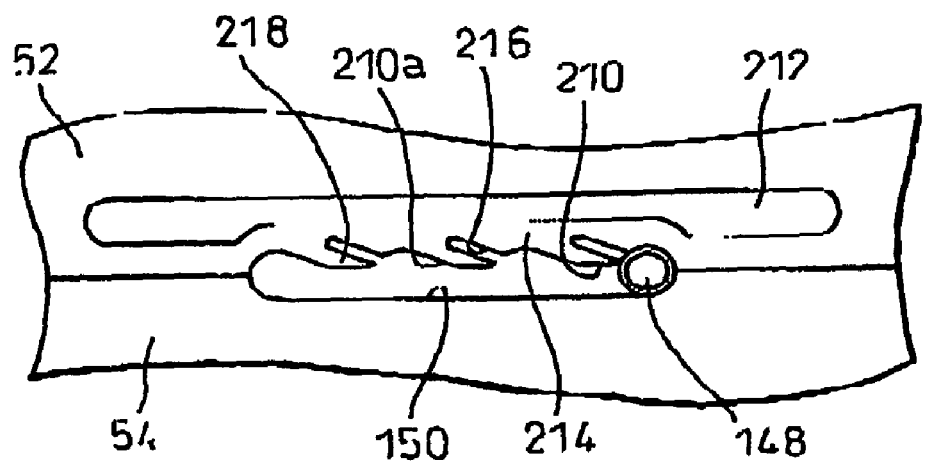
FIG. 15B is an enlarged illustration of another modification of the catch mechanism.

Moreover, the catch mechanism in the mechanical link arrangement 36 may be modified to adopt one or more configurations as shown in FIGS. 14 to 21B, which makes it possible to further improve the temporarily catching function in a step-by-step manner for the respective shifting motions of the cover members 26, 28, 30, 32. For example, as shown in FIGS. 14 to 15B, the right-upper frame part 52 may be provided with a cutout 210 defined with a longitudinally extending corrugated edge 210*a* having an asymmetrical profile at a position corresponding to the cutout 150 of the right-lower frame part 54, and a slot 212 extending parallel to the cutout 210 to open at a position close to the corrugated edge 210*a*, so as to define an elastic beam 214 arranged adjacent to the cutout 210. In this configuration, the engaging pin 148 formed on the right slider 66 is received in a catching hole, defined by the cutout 150 of the right-lower frame part 54 and the cutout 210 of the right-upper frame part 52, movably relative to each other in the longitudinal direction. Although not shown in the drawing, the left-upper frame part 58 may also be provided with a cutout and an elastic beam, both defined with a longitudinally extending corrugated edge having an asymmetrical profile.

As shown in FIG. 15A, the corrugated edge 210*a* of the cutout 210 of the right-upper frame part 52 includes a plurality of recesses, each of which is defined by front and rear edge parts extending at different angles α1, α2 with a straight edge of the cutout 150 of the right-lower frame part 54 (α1>α2 in the illustrated modification). The elastic engaging structure having the above configuration functions in a way generally similar to the elastic engaging structure as described in relation to FIGS. 12A to 12C.

That is, similar to the operation mode description with reference to FIGS. 12A to 12C, in the reduced-dimension or closed position of the housing, the engaging pin 148 formed on the right slider 66 is received on a front-end (left-end, in the drawing) recess of the corrugated edge 210*a* in the catching hole defined by the upper and lower cutouts 210, 150. In this state, the engaging pin 148 is caught or held at a front-limit position in the catching hole due to the function of the elastic beam 214, and thereby the right-rear cover member 30 fixed to the right slider 66 is retained at the housing closed position on the inner casing 34 through the right movable frame 50. When the right-rear cover member 30 is shifted in the rearward direction from the housing closed position, the engaging pin 148 starts to slide over a bulge of the corrugated edge 210*a* while elastically deforming the elastic beam 214, and thereafter is received on an adjacent recess of the corrugated edge 210*a* while being accompanied by the elastic restoration of the elastic beam 214. In this state, the engaging pin 148 is caught or held at an intermediate position in the catching hole due to the function of the elastic beam 214 and, thereby, the right-rear cover member 30 is retained at a position between the housing closed or reduced-dimension position and the housing open or enlarged-dimension position on the inner casing 34. When this operation is repeated, the right-rear cover member 30 is shifted to be spaced from the front cover member 26 secured to the right movable frame 50 in a step-by-step manner. At an instant when the engaging pin 148 is finally caught at a rear-limit (right-end, in the drawing) position in the catching hole, the right-rear cover member 30 is retained at the housing open position (FIG. 15A).

In the above configuration, each recess of the corrugated edge 210a formed on the right-upper frame part 52 is provided with front and rear edge parts, the rear one extending in more gentle slope angle than front one ($\alpha1 > \alpha2$), so that it is possible to shift the rear cover member 30 in a direction away from the front cover member 26 (i.e., from the housing closed position toward the housing open position) as described above by a relatively low force. On the other hand, a relatively large force is required for shifting the rear cover member 30 in a direction toward the front cover member 26 (i.e., from the housing open position toward the housing closed position). Consequently, it is surely avoidable that the each cover member 26, 28, 30, 32, retained at the desired open or intermediate position, is inadvertently shifted toward the housing closed position during the hand-held operation of the input device 10.

In the above configuration, the elastic beam 214 formed in the right-upper frame part 52 may be provided, as shown in FIG. 15B, with slight cuts 216 opening at the respective front edge parts of the recesses of the corrugated edge 210a. In this arrangement, when the cover member 30 is shifted toward the housing open position, a short arm portion 218 (including the rear edge part of each recess) formed adjacent to each cut 216 is also elastically deformed, in addition to the elastic deformation caused entirely in the elastic beam 214, so that it is possible to further reduce a force required to shift the cover member 30. In this connection, the arm portion 218 does not substantially affect the force for shifting the cover member 30 toward the housing closed position.

Figure 16:
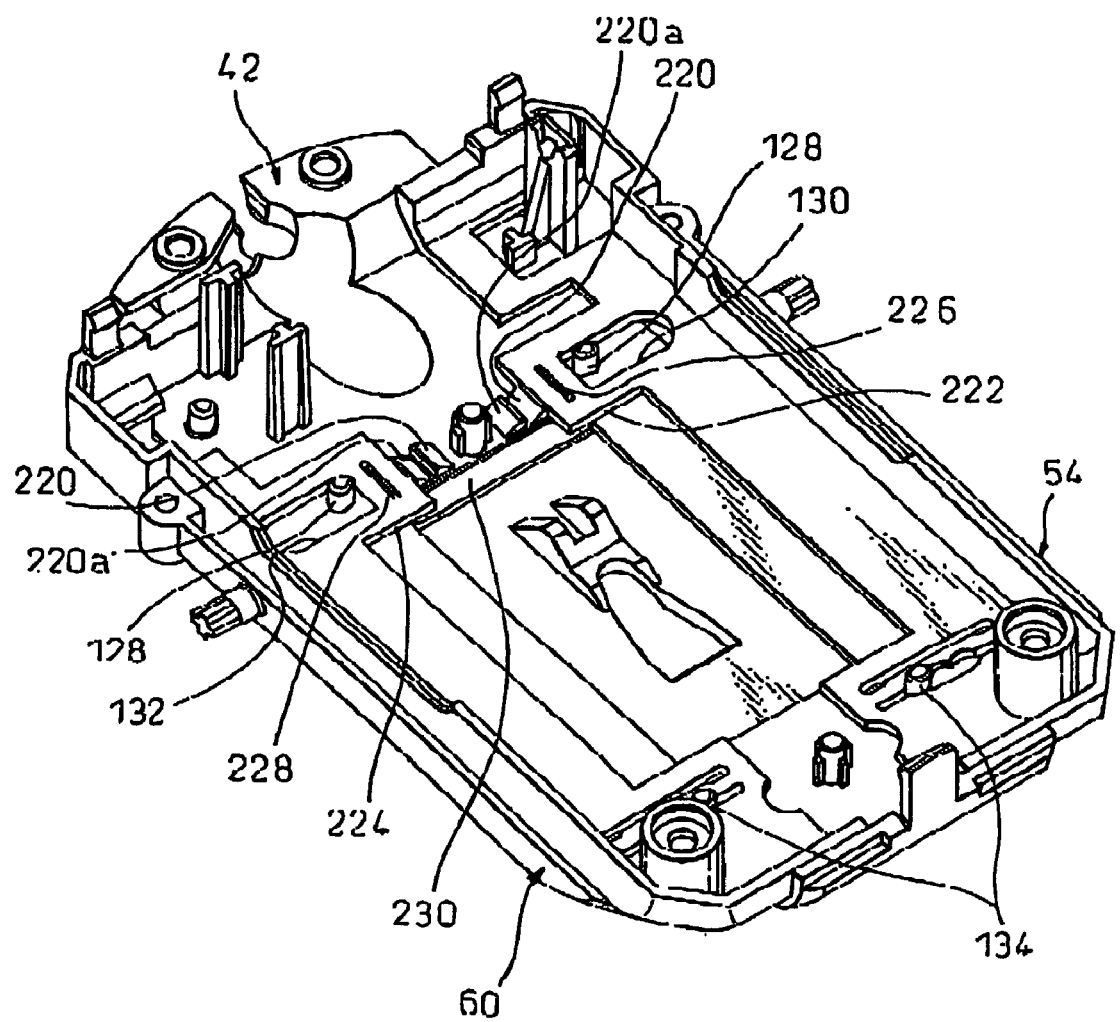
FIG. 16 shows a further modification of the catch mechanism.
Figure 17:
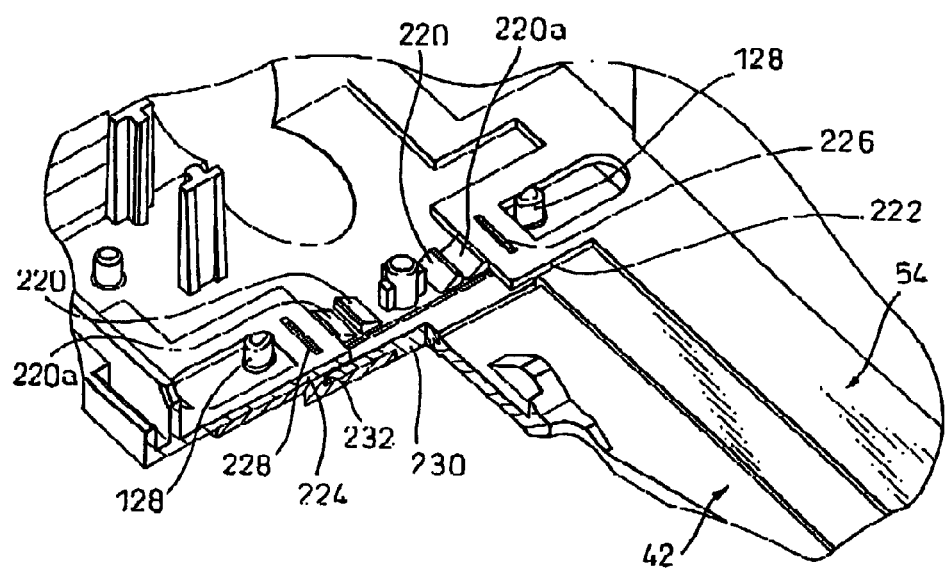
FIG. 17 is a partially cut-out perspective view of the catch mechanism of FIG. 16.

The above-described elastic engaging structure, acting to impart an orientation to a housing-dimension altering force, may also be formed between the inner casing 34 and the right and left movable frame 50, 56. For this arrangement, the catching holes 136, 138 as described may be provided respectively with corrugated edges 136a, 138a having asymmetrical shapes which serve to minimize the force required to shift the movable frames 50, 56 toward the housing enlarged-dimension position in comparison with a shifting force toward the housing reduced-dimension position. Alternatively, or in addition, another elastic engaging structure may be provided, as shown in FIGS. 16 and 17, which acts to elastically catch the right-lower frame part 54 of the right movable frame 50 and the left-lower frame part 60 of the left movable frame 56 at predetermined positions in the lateral direction. This elastic engaging structure includes a rigid element (or arrays 220 of catching projections) and an elastic element (or extensions 222, 224), provided respectively in association with the inner casing 34 and each cover member 26, 28, 30, 32. The rigid and elastic elements act to slide relative to each other under the elastic deformation of the elastic element, so as to perform an elastically catching or stopping action at the predetermined position.

More specifically, the lower case part 42 is provided on the upper side thereof with a pair of catching projection arrays 220 linearly aligned with each other at laterally symmetric positions in a certain area inside the pair of guide pins 128. Each catching projection array 220 includes a plurality of prismatic catching projections 220a disposed in a mutually spaced array. The catching projections 220a are oriented so that the slanted surfaces thereof face toward a longitudinally extending centerline of the lower case part 42. Corresponding to this arrangement, the right-lower frame part 54 is provided in a rectangular inside extension 222 thereof with a somewhat enlarged guide hole 130 capable of receiving the guide pin 128 with a gap defined therebetween and, near a distal end region of the extension 222, a recess 226 having a counter-prismatic shape capable of snugly receiving one catching projection 220a. The recess 226 opens wider in the lower side of the extension 222, facing oppositely to the lower case part 42, and slightly in the upper side opposite to the lower side. In the same way, the left-lower frame part 60 is provided in a rectangular inside extension 224 thereof with a somewhat enlarged guide hole 132 capable of receiving the guide pin 128 with a gap defined therebetween and, near a distal end region of the extension 224, a recess 228 having a counter-prismatic shape capable of snugly receiving one catching projection 220a, the recess 228 having a configuration similar to that of the recess 226. Each of the extension 222 of the right lower frame part 54 and the extension 224 of the left-lower frame part 60 functions as an elastic beam capable of slidably engaging with the individual catching projection 220a in the associated catching projection array 220, due to the inherent elasticity of the extension 222, 224.

The above-described catch mechanism further includes a release member 230 for forcibly causing the elastic deformations of the extensions 222, 224, as the elastic element of the elastic engaging structure, to release the catching action for the catching projection 220a. The release member 230 includes a center small head 230a and a broader arm 230b, and is received movably in the height direction in a stepped depression 232 formed through the lower case part 42 at a location in back and the vicinity of the catching projection arrays 220. In this state, the head 230a of the release member 230 is located to pass through the lower case part 42 so as to expose the end face of the head to the back side of the lower case part 42 (i.e., the base outer surface 14a of the input device 10), and the arm 230b is interposed at the opposite and regions thereof between the lower case part 42 and the extensions 222, 224.

Figure 18A:
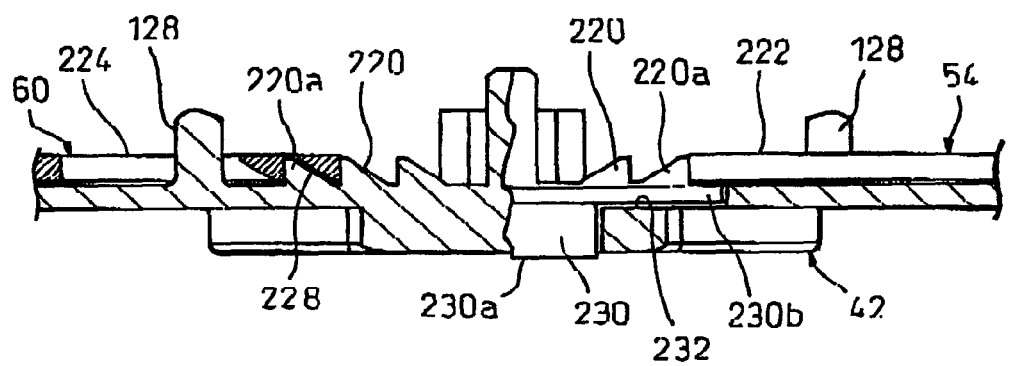
FIG. 18A is an enlarged vertical sectional view showing a release member of the catch mechanism of FIG. 16 in an inoperative position.
Figure 18B:
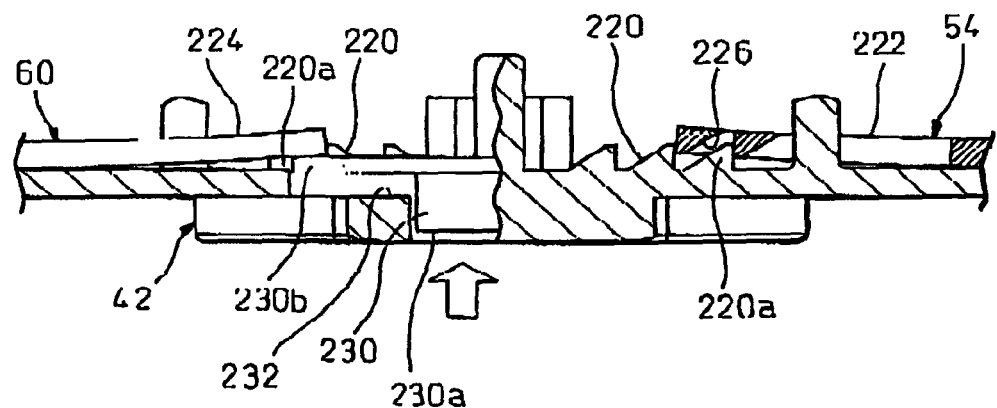
FIG. 18B is an enlarged vertical sectional view showing the release member in an operative position.

Referring now to FIGS. 18A and 18B, the mode of operation of the above-described catch mechanism acting for the lower pair of right and left frame part 54, 60. First, although not shown in the drawings, in the reduced-dimension or closed position of the housing, the innermost catching projections 220a in the pair of catching projection arrays 220 formed on the lower case part 42 are respectively received in the recesses 226, 228 formed in the extensions 222, 224 of the right and left lower frame parts 54, 60. In this state, the right-lower frame part 54 (or the right movable frame 50) and the left-lower frame part 60 (or the left movable frame 56) are retained at the housing closed position on the lower case part 42 (or the inner casing 34). When the right and left movable frame 50, 56 are respectively shifted in the lateral direction from the housing closed position, the extensions 222, 224 start to slide over the catching projections 220a received in the recesses 226, 228 under sliding contact between the slanted surfaces of the projections 220a and the counterpart slanted faces of the recesses 226, 228, while the extensions 222, 224 are elastically deformed to rise the distal end regions thereof. Just after the extensions 222, 224 have run beyond these catching projections 220a, the extensions 222, 224 are elastically restored and receive the next catching projections 220a into the respective recesses 226, 228, although not shown in the drawings. In this state, the right and left movable frames 50, 56 are retained at an intermediate position between the housing closed position and the housing open position on the inner casing 34. When this operation is repeated, the right and left movable frames 50, 56 are shifted to be spaced from each other in a step-by-step manner. At an instant when the outermost catching projections 220a in the catching projection arrays 220 are finally received in the counterpart recesses 226, 228 of the extensions 222, 224, the right and left movable frames 50, 56 are retained at the housing open position (FIG. 18A).

In the above configuration, the pair of catching projection arrays 220 formed on the lower case part 42 are oriented so that the slanted surfaces of the catching projections 220a face toward the longitudinally extending centerline of the lower case part 42, so that it is possible to shift the right and left movable frames 50, 56 in a direction away from each other (i.e., a direction toward the housing open position) as described above by a relatively low force. On the other hand, a significantly large force is required for shifting the right and left movable frames 50, 56 in a direction toward each other (i.e., a direction toward the housing closed position), which generally makes it difficult to shift the movable frames 50, 56, because the generally vertical outer faces of the catching projections 220a are confronted and abutted with the generally vertical outer faces of the recesses 226, 228. Then, as shown in FIG. 18B, in the case where the right and left movable frames 50, 56 retained at the desired housing open or intermediate position are shifted toward the housing closed position, the operator pushes with, e.g., his finger, the end face of the head 230a of the release member 230, exposed to the back side of the lower case part 42, so as to depress the release member 230 into a housing interior, and thereby forcibly raising the distal end regions of the extensions 222, 224 through the opposite end regions of the arm 230b, so as to bend the extensions 222, 224 to provide convexly curved lower faces. As a result, the recesses 226, 228 of the extensions 222, 224 are disengaged from the catching projections 220a, and thereby it is possible to readily shift the right and left frame parts 50, 56 in the direction toward the housing closed position.

Figure 19:
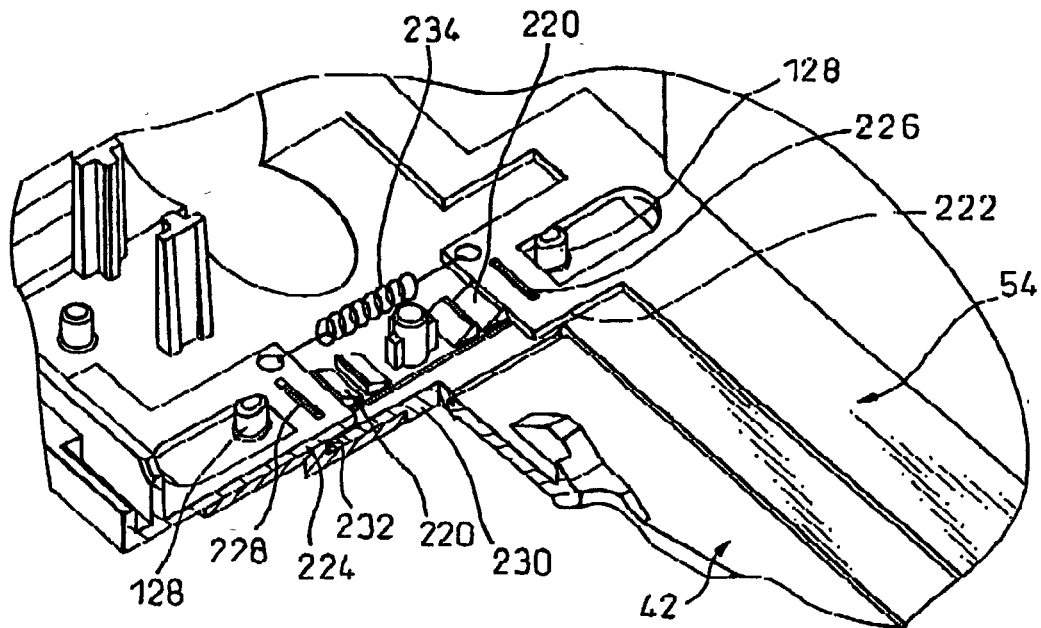
FIG. 19 is a partially cut-out perspective view showing a modification of the catch mechanism of FIG. 16.
Figure 20:
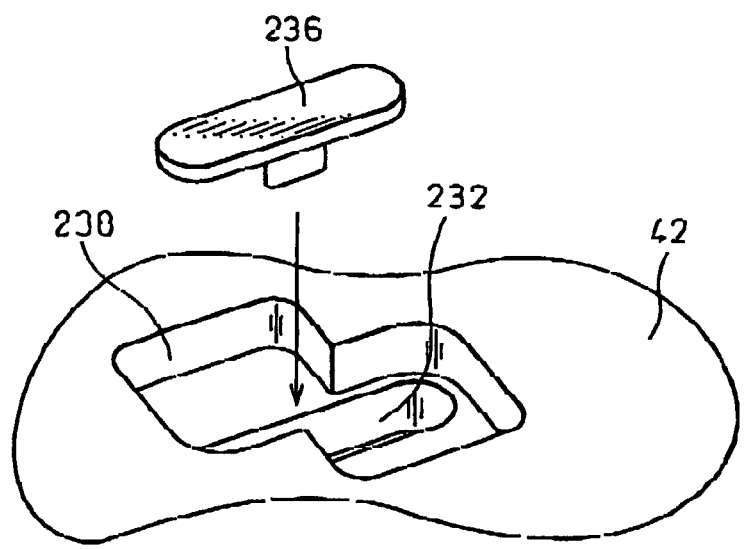
FIG. 20 is a perspective view of a lock element installable in the catch mechanism of FIG. 16.
Figure 21A:
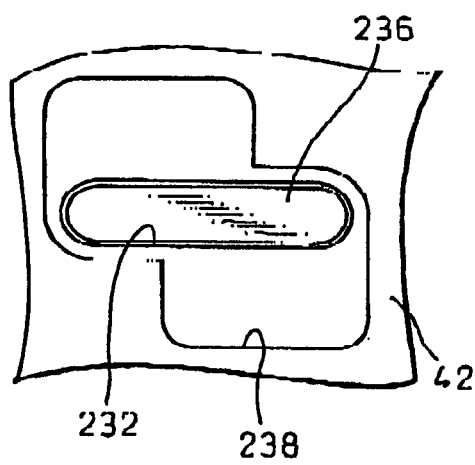
FIG. 21A illustrates an operation of the lock element of FIG. 20 in an inoperative position.
Figure 21B:
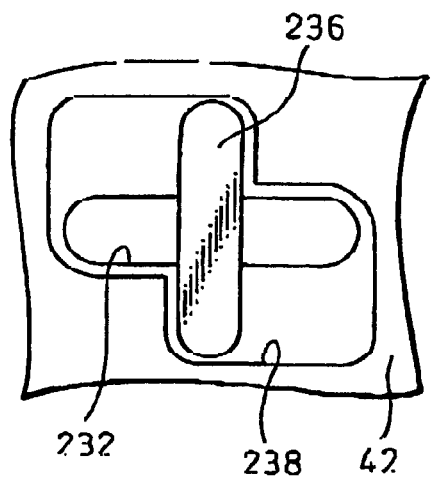
FIG. 21B illustrates the operation of the lock element in an operative position.
Figure 22A:
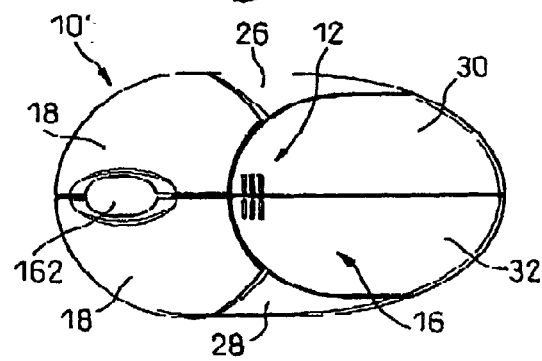
FIG. 22A is a plan view of a modification of the input device in the position shown in FIG. 1A.
Figure 22C:
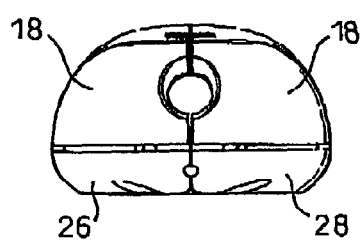
FIG. 22C is a front view of the modification as shown in FIG. 22A.
Figure 22B:
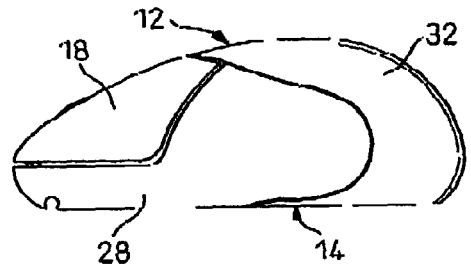
FIG. 22B is a side view of the modification as shown in FIG. 22A.
Figure 22D:
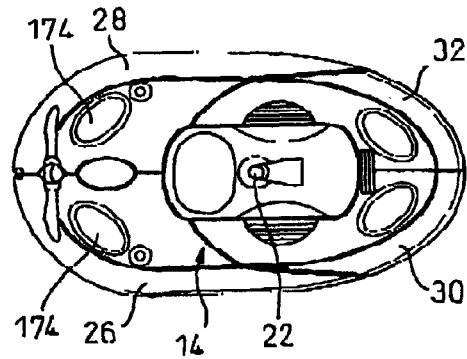
FIG. 22D is a bottom plan view of the modification as shown in FIG. 22A.
Figure 24A:
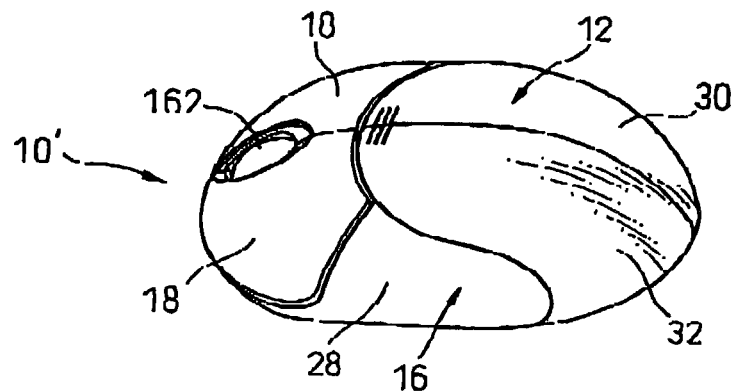
FIG. 24A is a top perspective view of the modification as shown in FIG. 22A.
Figure 24B:
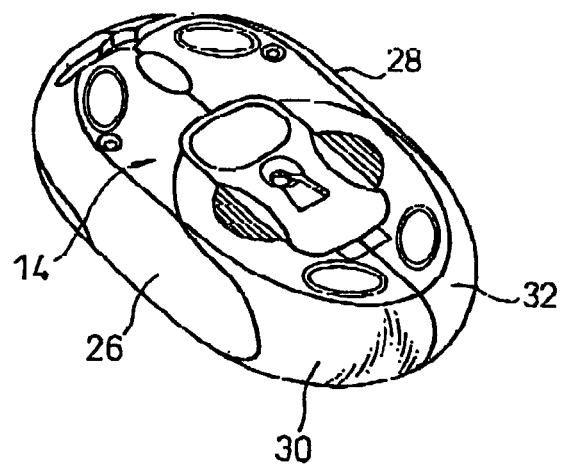
FIG. 24B is a bottom perspective view of the modification as shown in FIG. 22A.
Figure 24C:
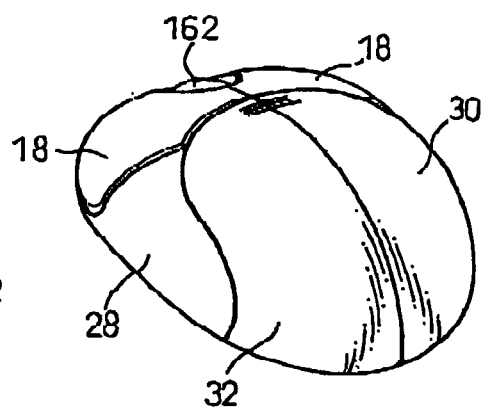
FIG. 24C is another top perspective view of the modification as shown in FIG. 22A.
Figure 25A:
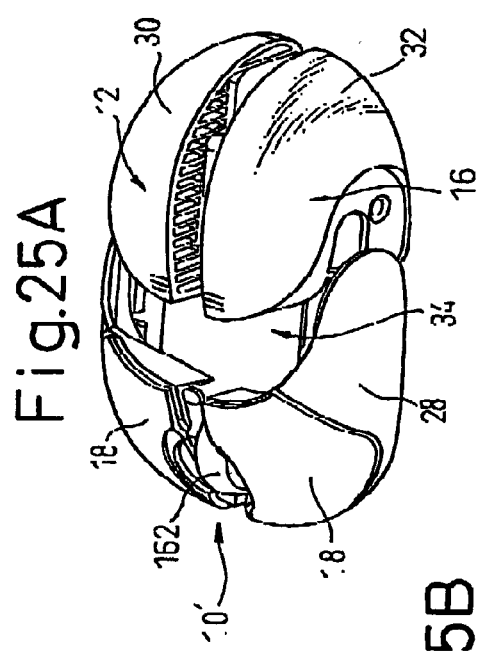
FIG. 25A is a top perspective view of the modification as shown in FIG. 23A.
Figure 25C:
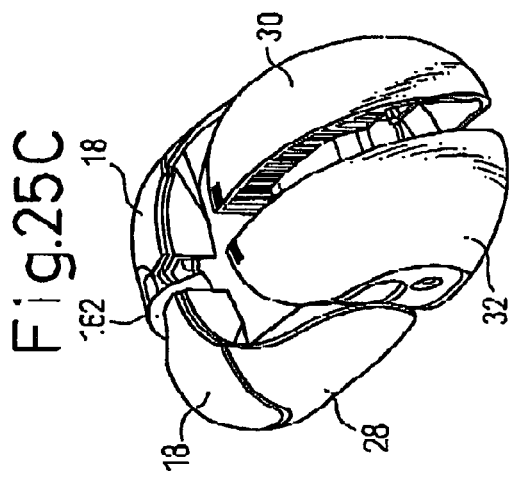
FIG. 25C is another top perspective view of the modification as shown in FIG. 23A.
Figure 25B:
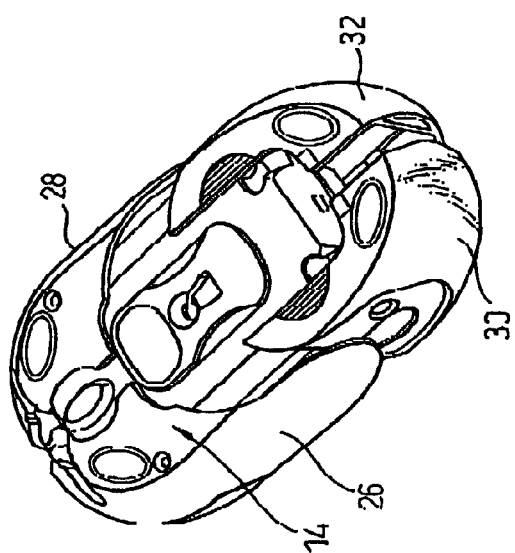
FIG. 25D is a bottom perspective view of the modification in FIG. 23A.

In the above configuration, as shown in FIG. 19, it is advantageous that an elastic member (e.g., a tension coil spring) 234 is provided between the extension 222 of the right-lower frame part 54 and the extension 224 of the left-lower frame part 60 to elastically bias them toward each other. This arrangement makes it possible that the right and left movable frames 50, 56 retained at a desired housing open or intermediate position are automatically and quickly shifted toward the housing closed position due to the function of the elastic member 234, at an instant when the release member 230 is operated in the above-described manner to release the interengagement between the extensions 222, 224 and the catching projections 220a. It should be noted that the outside face of each catching projection 220a in the catching projection array as well as the counterpart outside face of each recess 226, 228 of the extension 222, 224 are not limited to be formed as the illustrated vertical faces, but may be formed as slanted faces steeper than the inside slanted faces thereof.

Moreover, in the above configuration, a lock element 236 rotatably attached to the head 230a of the release member 230 may be provided for prevent the mishandling of the release member 230. The lock element 236 is shaped to be smoothly receivable into the depression 232 of the lower case part 42, in which the head 230a of the release member 230 is inserted, and is received within a second depression 238 formed in the back side of the lower case part 42 in a manner rotatable inside the second depression 238. In this arrangement, when the operator pushes the release member 230 for operation as described above, the lock element 236 is located at a position or angle where the profile of the lock element 236 matches the opening shape of the depression 232 (see FIG. 21A). Also, when the right and left movable frames 50, 56 (i.e., the right pair of front and rear cover members 26, 30 and the left pair of front and rear cover members 28, 32) should be retained at a desired open or intermediate position, the lock element 236 is rotated in the second depression 238 to be located at a position deviated from the opening of the depression 232 by a desired angle. In this position, the lock element 236 and thus the release member 230 cannot be pushed into the housing interior, and thereby it is surely avoidable that the housing assembly 16 is inadvertently closed or reduced in dimensions due to the mishandling of the release member 230.

The input device 10 of the above embodiment has a good or superior appearance in design. Especially, the input device 10 has an extremely superior design performance in comparison with the conventional input device with an extendible body or housing, in a point that the housing assembly 16 includes a palm-rest section 12 presenting the smoothly curved, egg-shaped friendly profile which permits the housing assembly 16 to be comfortably held or covered by the operator's palm in both the housing reduced-dimension position and the housing enlarged-dimension position as well as any intermediate position. FIGS. 22A to 25C show an input device 10' having a good appearance, the detail of which is slightly different from that of the input device 10, as seen in various orientations in both the housing reduced-dimension position and the housing enlarged-dimension position. The input device 10' has substantially the same structure as the input device 10 of the above-described embodiment, and thus corresponding components are denoted by the common reference numerals and the explanation thereof is not repeated.

Incidentally, the auxiliary entering mechanism 160, as already described, possesses a novel configuration for significantly reducing noise generated from the resisting section 168 provided to impart chattering to the rotary action of the operating member 162, as well as for permitting the correct switching or pushing operation to be stably performed. Referring now to FIGS. 26 to 33, the auxiliary entering mechanism 160 will be described in more detail.

Figure 26:
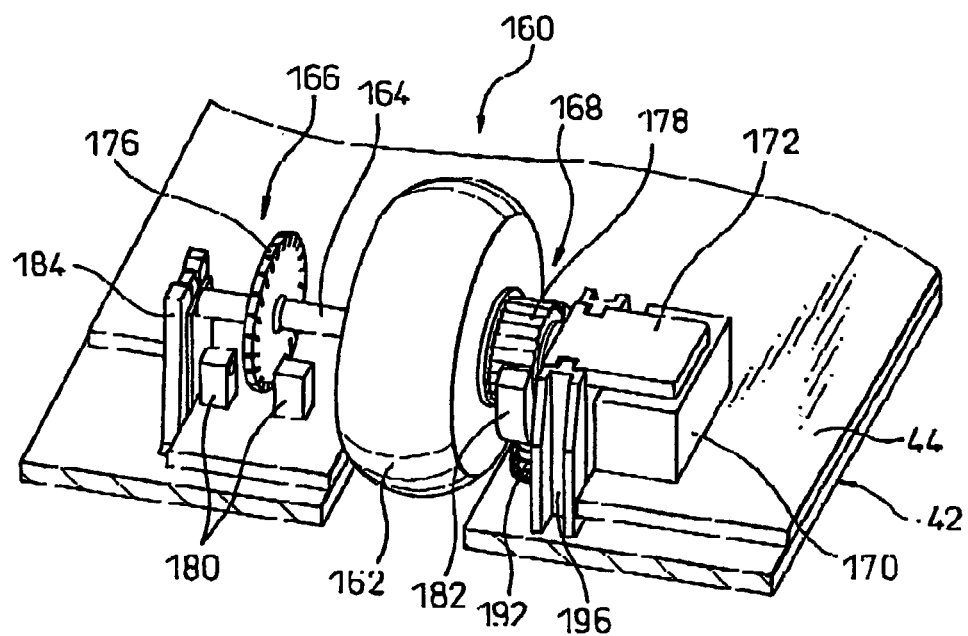
FIG. 26 is an enlarged perspective view of an auxiliary entering mechanism in the input device of FIG. 1.
Figure 27:
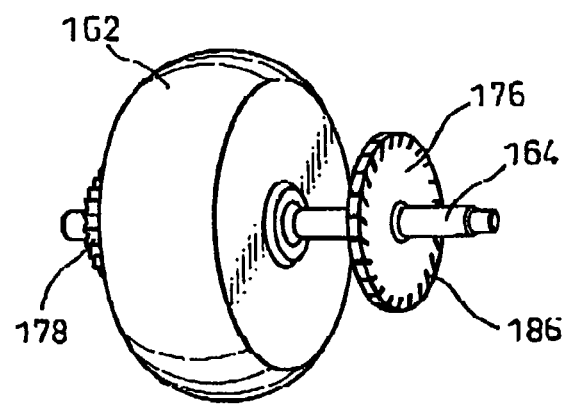
FIG. 27 is a perspective view of an operating member of the auxiliary entering mechanism of FIG. 26.
Figure 28:
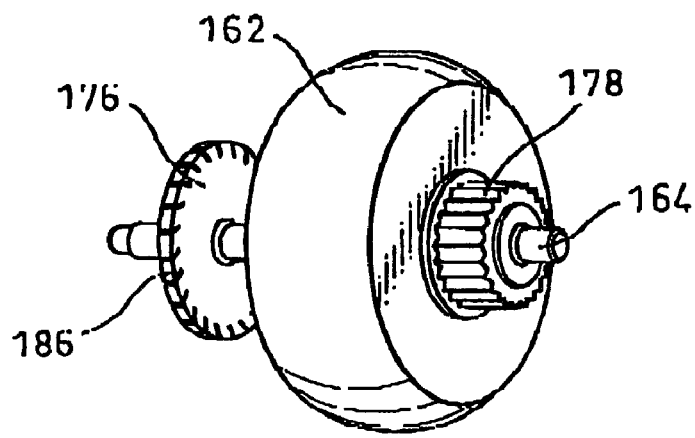
FIG. 28 is another perspective view of the operating member.

As shown in FIGS. 26 to 28, the rotation shaft 164 of the operating member 162 is provided with a detectable disc 176 fixed at one longitudinal end region of the shaft and a toothed roller (e.g., a spur gear) 178 fixed at the other longitudinal end region of the shaft opposite to the detectable disc 176. The detectable disc 176 is one component of the rotation detecting section 166 as described, and is disposed in association and non-contact with an optical system (i.e., a light emitting element and a light receiving element) 180, as another component of the rotation detecting section 166, mounted on the circuit board 44. The toothed roller 178 is one component of the resisting section 168 as described, and is disposed in continuous contact with a support member 182, as another component of the resisting section 168, installed on the lower case part 42. The rotation shaft 164 is freely rotatably carried at one longitudinal end thereof, extending outward from the detectable disc 176, on a column 184 projecting at a predetermined position in the upper face of the lower case part 42, and is rotatably supported at another longitudinal end on the support member 182 through the toothed roller 178, located at another predetermined position in the upper face of the lower case part 42.

The detectable disc 176 is provided along a circular outer periphery thereof with a plurality of slits 186 arranged at regular intervals in a circumferential direction. The slits 186 of the detectable disc 176 are adapted to subsequently traverse one-by-one an optical path of the optical system 180 of the rotation detecting section 166, in accordance with the rotary action of the rotation shaft 164 and the detectable disc 176, during the period when the operating member 162 is rotated for operation. Consequently, the rotation detecting section 166 detects the rotation angle of the operating member 162, and outputs a signal for performing an image shifting or scrolling operation on a display screen, representing the detected data of the rotation angle.

In the illustrated embodiment, the plural slits 186 of the detectable disc 176 are formed to be slightly inclined in the same direction relative to a normal diametral direction. According to this configuration, even if the optical path of the optical system 180 is provided at a level lower than the rotation shaft 164, it is possible for each slit 186 to traverse the optical path of the optical system 180 at a position where the slit extends in generally parallel to the surface of the circuit board 44. As a result, it is possible to output an accurate detecting signal, even when a space for installing the rotation detecting section 166 is restricted in its dimensions.

Figure 29A:
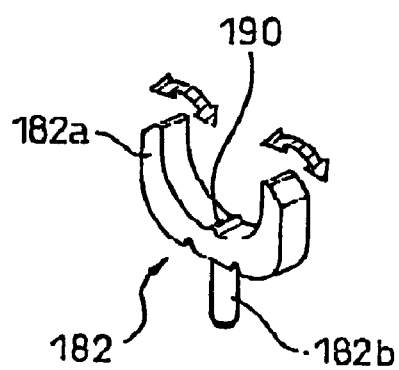
FIG. 29A is a perspective view of a support member of a resisting section in the auxiliary entering mechanism of FIG. 26.

As shown in FIG. 29A, the resisting section 168 includes the support member 182 for circumferentially surrounding at least a part of the rotation shaft 164 and rotatably supporting the rotation shaft 164, a set of engaging members 188, 190 respectively provided to the rotation shaft 164 and the support member 182, so as to be snugly engaged with each other at a certain rotation angle of the rotation shaft 164, and an elastic member 192 for elastically biasing the support member 182 toward the rotation shaft 164 and ensuring a temporary change of the drag force due to a snug engagement of the set of engaging members 188, 190.

Figure 29B:
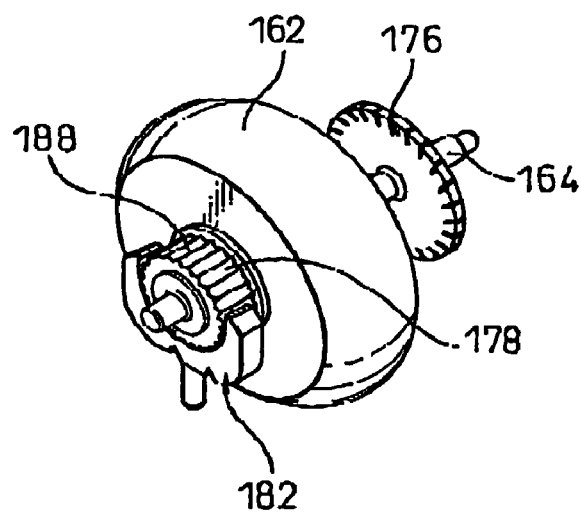
FIG. 29B is a perspective view of the resisting section with several components assembled.

The support member 182 includes a U-shaped elastic arm portion 182*a* and a leg portion 182*b* projecting outward from the center of the arm portion 182*a* (FIG. 29A). The arm portion 182*a* of the support member 182 supports the toothed roller 178 fixed to the rotation shaft 164, so as to surround the outer circumferential face of the toothed roller preferably in an elastically deformed condition of the arm portion (FIG. 29B). The leg portion 182*b* of the support member 182 is fitted into a support hole (not shown) formed in the lower case part 42 in a longitudinally slidable manner.

The set of engaging members 188, 190 are structured from a combination of a plurality of teeth 188 formed at regular intervals in the circumferential direction on the outer circumferential face of the toothed roller 178 fixed to the rotation shaft 164 and extending in parallel to the center axis of the tooted roller, and one tooth 190 locally protruding inward at a center of the arm portion 182*a* of the support member 182. The tooth 190 of the support member 182 is shaped to be subsequently engagable one-by-one with the plural tooth 188 of the toothed roller 178 during the rotation of the toothed roller 178. Each of the toothed roller 178 and the support member 182 may be integrally molded from a resinous material.

Figure 30:
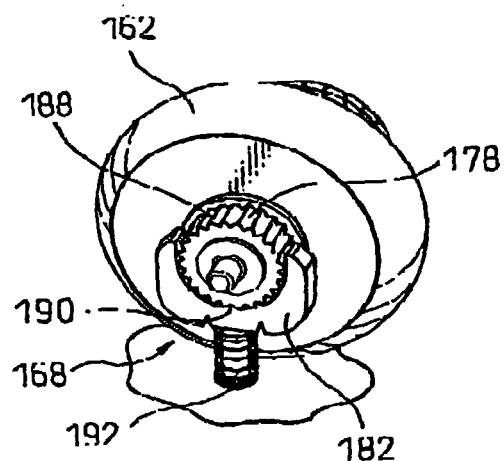
FIG. 30 is a perspective view of the resisting section in the auxiliary entering mechanism of FIG. 26.

As shown in FIG. 30, the elastic member 192, formed from, e.g., a compression coil spring, is disposed between the support member 182 and the lower case part 42 so as to extend around the leg portion 182*b* of the support member 182. The elastic member 192 elastically urges the support member 182 toward the rotation shaft 164, so as to press the arm portion 182*a* of the support member 182 against the outer circumferential face of the toothed roller 178, and to maintain the rotation shaft 164 in a horizontal position generally parallel to the surface of the circuit board 44 against the pushing force applied to the operating member 162, during the normal rotation for operation of the operating member 162.

According to the resisting section 168 having the above configuration, the teeth 188 of the toothed roller 178 are engaged with the tooth 190 of the support member 182, at every certain rotation angles corresponding to the pitch of teeth 188 of the toothed roller 178, to temporarily change the drag force against the rotary action of the rotation shaft 164 of the operating member 162, during a period when the operating member 162 rotates for normal operation. In this arrangement, the arm portion 182*a* of the support member 182 supports the toothed roller 178 fixed to the rotation shaft 164 in such a manner as to surround the outer circumferential face of the toothed roller, and the mutually engaged teeth 188, 190 therebetween are elastically pressed against each other due to the function of the elastic member 192, so that it is possible to further clarify the temporary change of the drag force, as well as to effectively suppress noise which may be generated when the teeth 188, 190 are mutually engaged. Accordingly, it is possible for the operator to accurately rotate the operating member 162 for operation while sensing clear and noiseless "chattering" on his fingertip.

Figure 31A:
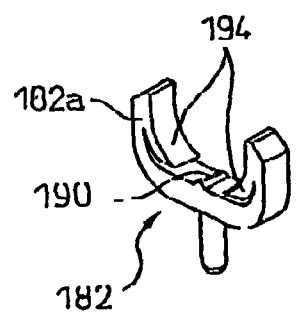
FIG. 31A is a perspective view of a support member of a modification of the resisting section.
Figure 31B:
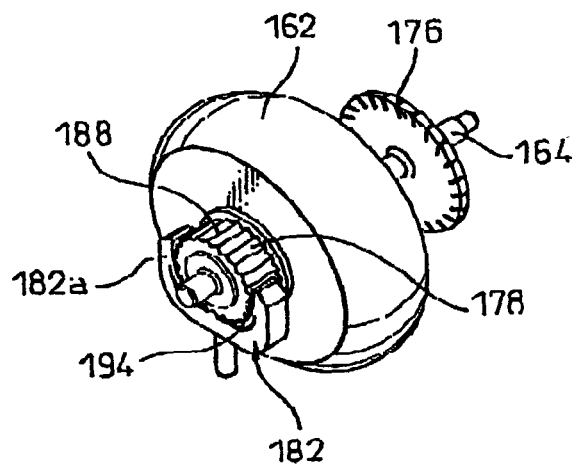
FIG. 31B is a perspective view of the modification of the resisting section with several components assembled.

In the above configuration, the arm portion 182*a* of the support member 182 may be provided with a pair of assistant elastic pieces 194, as shown in FIG. 31A, adapted to surround the toothed roller 178 fixed to the rotation shaft 164 in an elastically deformed state. The assistant elastic pieces 194 act to improve the snug or close fitting condition between the outer circumferential face (or tips of teeth 188) of the toothed roller 178 and the inner face of the arm portion 182*a* (see FIG. 31B). As a result, noise is significantly effectively suppressed during the rotation of the operating member 162 for operation. It should be noted that the set of engaging members of the resisting section 168 is not limited to the combination of plural teeth 188 and one tooth 190 as described, but may be structured from the combination of plural teeth and plural teeth, or the combination of one or more teeth and one or more grooves.

Figure 32B:
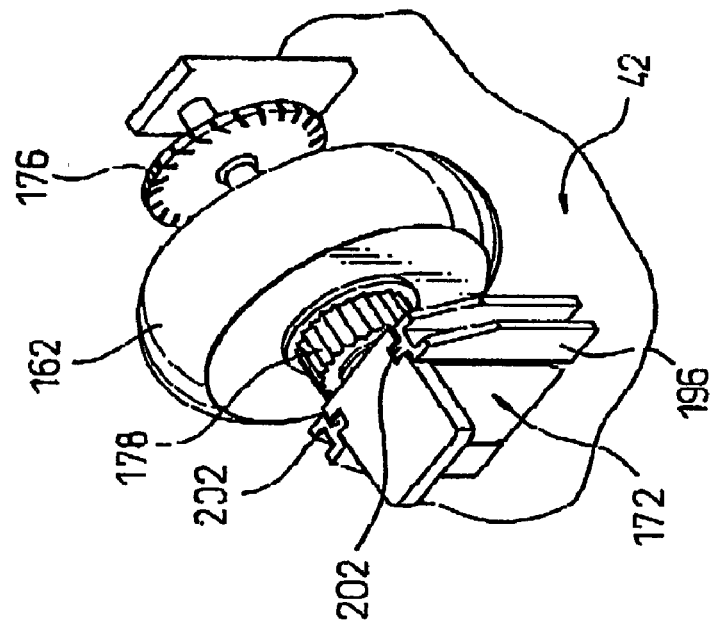
FIG. 32B is a perspective view of the switching section in a post-assembled state.
Figure 32A:
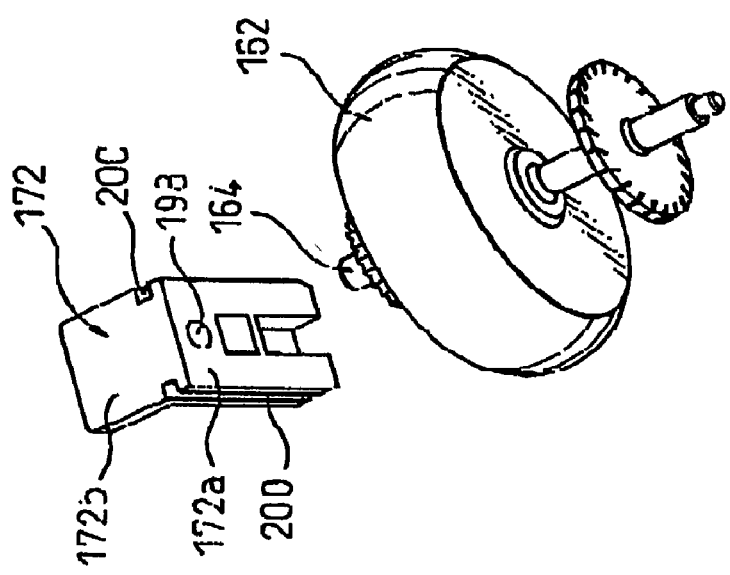
FIG. 32A is a perspective view of a switching section in the auxiliary entering mechanism of FIG. 26 in a pre-assembled state.
Figure 33:
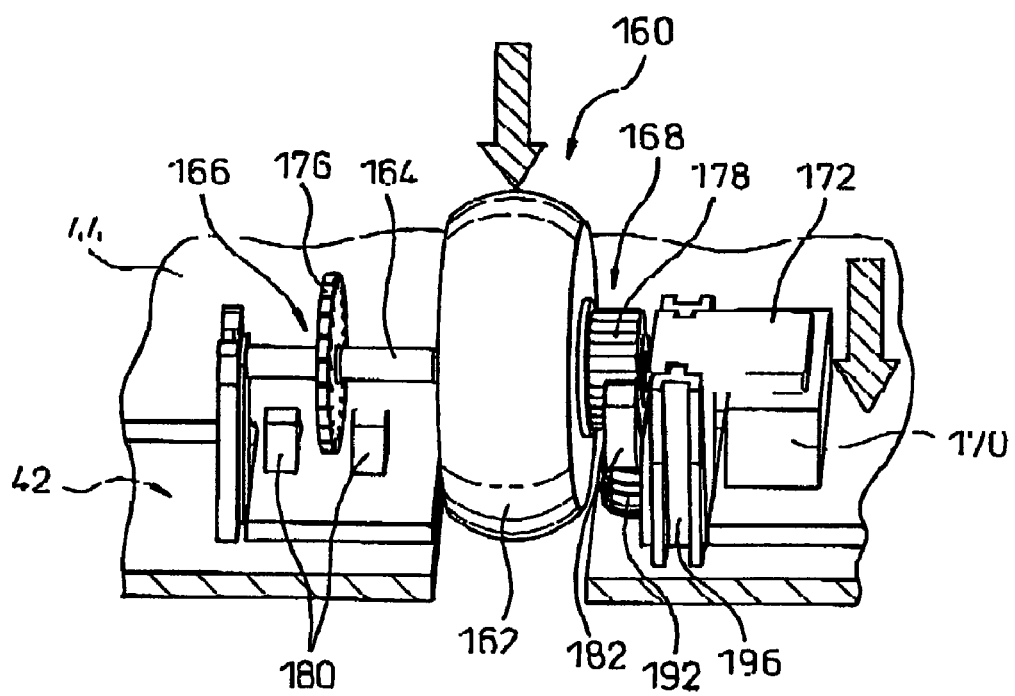
FIG. 33 is a perspective view showing an operation of the switching section in the auxiliary entering mechanism of FIG. 26 in a pre-assembled state.

The auxiliary entering mechanism 160 as illustrated further includes the switching unit 170, as already described, arranged in association with the rotation shaft 164, the pushing member 172, as already described, rotatably attached to the rotation shaft 164 independently of the resisting section 160 for transmitting a pushing force applied onto the operating member 162 to the switching unit 170 to actuate the switching unit 170, and a guide member 196 for guiding the pushing member 172 in a direction generally orthogonal to the rotation shaft 164. As shown in FIGS. 32A and 32B, the pushing member 172, formed as a L-shaped plate which may be integrally molded from a resinous material, is provided with a guide portion 172*a* and a pusher portion 172*b*, integrally formed to extend orthogonal to each other. The guide portion 172*a* is provided, in a face opposite to the pusher portion 172*b*, with a bearing hole 198 rotatably bearing the tip end of the rotation shaft 164 adjacent to the toothed roller 178. The guide portion 172*a* is also provided along opposite edges thereof with guide channels 200 slidably engaging with the guide member 196 (FIG. 32A).

The guide member 196, formed as a pair of columns uprightly formed at a predetermined position on the upper side of the lower case part 42, is provided on the opposing faces thereof with a pair of rails 202 extending in the height direction. The rails 202 of the guide member 196 are slidably engaged with the respective guide channels 200 formed on the guide portion 172*a* of the pushing member 172, so as to linearly guide the pushing member 172 in the height direction above the lower case part 42. In this situation, the pusher portion 172b of the pushing member 172 is located just above the movable element in the switching unit 170 mounted on the circuit board 44.

In the above configuration, the pusher portion 172b of the pushing member 172 is maintained at a position where no pushing force is applied to the movable element in the switching unit 170, due to the biasing force of the elastic member 192 of the resisting section 168, during the normal rotation of the operating member 162 for operation. When the operator pushes the operating member 162 to press it into the housing interior, the rotation shaft 164 is pivoted or swung about the shaft end supported on the column 184 to act as a fulcrum, the support member 182 moves toward the lower case part 42 while flexing the elastic member 192 of the resisting section 168, and simultaneously the pushing member 172 moves accurately in a vertical downward direction above the lower case part 42 under the guiding function of the guide member 196 (see FIG. 33). Consequently, the pushing member 192 correctly pushes, on the pusher portion 192b, the movable element in the switching unit 170, located just beneath the pusher portion, so as to actuate the switching unit 170. When the operator releases the pushing force to the operating member 162, the switching unit 170 is set off, due to the elastic restoring force of the elastic member 192 as well as the inherent elastic restoring force of the movable element in the switching unit 170, and the rotation shaft 164 returns to the horizontal position.

Figure 34A:
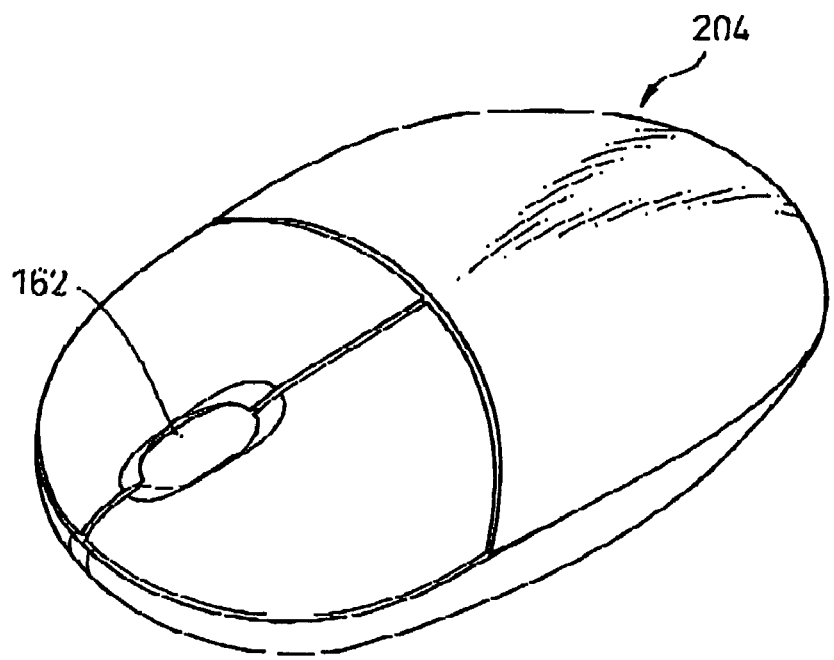
FIG. 34A is a perspective view of another input device, to which the auxiliary entering mechanism of FIG. 26 is applicable.
Figure 34B:
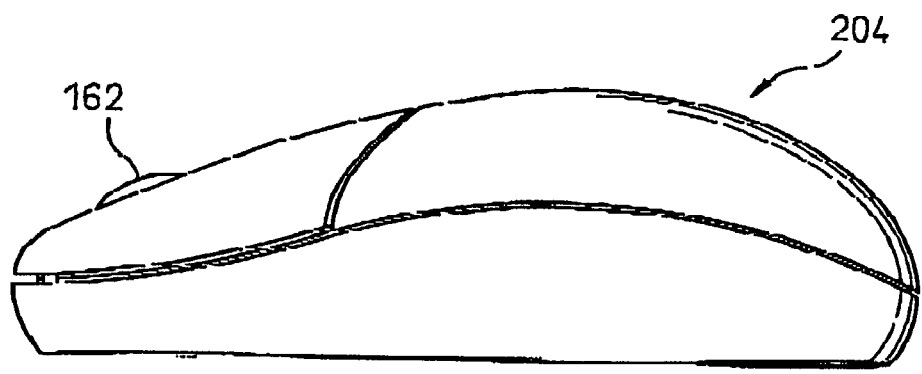
FIG. 34B is a side view of the input device of FIG. 34A.

The auxiliary entering mechanism 160 having the above-described configuration is not limited to be applied to the input device 10 with an extendible housing as described, but may be applied to an input device 204 with a normal inextensible housing, as shown in FIGS. 34A and 34B, as a third entering mechanism having the rotary operating member 162. In this arrangement, it is also possible to reduce the noise during the rotary action of the operating member 162, which results in a comfortable operation feeling, and to perform a stable operation of a switching unit.

As will be understood from the above description, according to the invention, an input device having an extendible body or housing, on which an operator puts his hand for data entering operation, is provided, which allows the dimensions of the housing to be altered (i.e., enlarged or reduced) in an easy and stable manner in accordance with the operator's requirement, without deteriorating a data entering operability and causing a malfunction of an extendible feature, and thus which is functionally superior in ergonomic sense. Also, according to the invention, an input device having a third entering mechanism with a rotary operation member is provided, which makes it possible to effectively and significantly reduce noise generated when the operating member rotates for operation, and, in the case where a switching unit it installed, to stably perform a switching or pushing operation for actuating the switching unit.

While the invention has been particularly shown and described with reference to preferred embodiments thereof, it will be understood by those skilled in the art that various changes and modifications may be made without departing from the spirit and scope of the following claims.

The invention claimed is:

1. An input device, comprising:
    a housing assembly including a palm-rest section and a base section opposite to said palm-rest section;
    a switch mechanism accommodated in said housing assembly and including an operating section arranged adjacent to said palm-rest section; and
    a motion detecting mechanism accommodated in said housing assembly and including a detecting section arranged adjacent to said base section;
    wherein said housing assembly comprises:
    a plurality of cover members configured by dividing said palm-rest section and said base section into plural parts in a condition where said palm-rest section and said base section are integrally associated with each other;
    an inner casing at least partially enclosed within said plurality of cover members, said inner casing carrying said switch mechanism and said motion detecting mechanism; and
    a link arrangement for linking said plurality of cover members with said inner casing, said link arrangement permitting said plurality of cover members to shift, relative to each other in a desired direction, toward or away from each other, and relative to said inner casing.

2. An input device as set forth in claim 1, wherein said base section includes a generally flat outer surface, and wherein said plurality of cover members are shiftable relative to each other in a direction substantially parallel to said outer surface of said base section.

3. An input device as set forth in claim 1, wherein at least one of said cover members is configured to be shifted together with said operating section of said switch mechanism relative to said inner casing.

4. An input device as set forth in claim 3, further comprising a transmitting member arranged between a switching unit of said switch mechanism carried on said inner casing and said operating section shiftable together with said at least one of said cover members, for transmitting a switching force applied onto said operating section to said switching unit independently of a position of said operating section.

5. An input device as set forth in claim 1, wherein said link arrangement includes an interlocking mechanism for interlocking at least two of said cover members with each other.

6. An input device as set forth in claim 1, wherein said link arrangement includes a catch mechanism for releasably catching a shifting motion of at least one of said cover members relative to said inner casing at a predetermined position.

7. An input device as set forth in claim 6, wherein said catch mechanism includes an elastic engaging structure provided respectively in association with said inner casing and said at least one of said cover members, and wherein said elastic engaging structure includes a rigid element and an elastic element slidably engaged with said rigid element, said rigid element and said elastic element shifting relative to each other under an elastic deformation of said elastic element to perform a catching action at said predetermined position.

8. An input device as set forth in claim 7, wherein said catch mechanism further includes a release member for forcibly causing said elastic deformation of said elastic element of said elastic engaging structure to release said catching action.

9. An input device as set forth in claim 1, further comprising an auxiliary entering mechanism carried on said inner casing independently of said switch mechanism and said motion detecting mechanism, wherein said auxiliary entering mechanism includes a rotary operating member partially exposed adjacent to said palm-rest section, at least one of said cover members shifting relative to said rotary operating member.

* * * * *